(12) United States Patent
Gosselin et al.

(10) Patent No.: US 12,303,865 B2
(45) Date of Patent: May 20, 2025

(54) AQUEOUS MANUFACTURE OF AMINATED MOF COMPLEXES

(71) Applicant: MOSAIC MATERIALS, INC., Alameda, CA (US)

(72) Inventors: Aeri Gosselin, El Cerrito, CA (US); Joel H. Gamoras, Vallejo, CA (US); Zoey Rose Herm, Oakland, CA (US); Thomas M. McDonald, San Francisco, CA (US); Graham B. Wenz, Richmond, CA (US); Lina Zhu, Woodland, CA (US)

(73) Assignee: MOSAIC MATERIALS, INC., Alameda, CA (US)

( * ) Notice: Subject to any disclaimer, the term of this patent is extended or adjusted under 35 U.S.C. 154(b) by 450 days.

(21) Appl. No.: 17/962,957

(22) Filed: Oct. 10, 2022

(65) Prior Publication Data

US 2024/0131491 A1    Apr. 25, 2024

(51) Int. Cl.
*B01D 53/04* (2006.01)
*B01J 20/22* (2006.01)
(Continued)

(52) U.S. Cl.
CPC ............ *B01J 20/226* (2013.01); *B01D 53/04* (2013.01); *B01J 20/3071* (2013.01);
(Continued)

(58) Field of Classification Search
CPC ........ B01D 53/02; B01D 53/04; B01D 53/62; B01D 2253/103; B01D 2257/502; Y02C 20/40
(Continued)

(56) References Cited

U.S. PATENT DOCUMENTS

| | | | |
|---|---|---|---|
| 2005/0154222 A1 | 7/2005 | Muller et al. | |
| 2012/0070353 A1* | 3/2012 | Trukhan | C10L 3/10 |
| | | | 423/239.1 |

(Continued)

FOREIGN PATENT DOCUMENTS

| | | |
|---|---|---|
| WO | 2013059527 A1 | 4/2013 |
| WO | 2015164543 A1 | 10/2015 |
| WO | 2018152438 A1 | 8/2018 |

OTHER PUBLICATIONS

"Indoor Air Quality Submarines," Persson, O.; Wadso, L., "Proceedings: Indoor Air", 2002.
(Continued)

*Primary Examiner* — Frank M Lawrence, Jr.
(74) *Attorney, Agent, or Firm* — CANTOR COLBURN LLP

(57) ABSTRACT

This disclosure relates to a select class of porous adsorbent, metal-organic frameworks (MOFs) capable of adsorbing carbon dioxide, their manufacturing, applications, and methods of use. Specifically, this disclosure relates to the solvo(hydro)thermal synthesis of a family of metal-organic frameworks, and their subsequent processing and transformation into material forms suitable for use in acid gas separations. More specifically, this disclosure relates to the preparation and recovery of MOFs at multiple scales of production, demonstrating the suitability and robustness of the materials thus obtained by the disclosed synthetic route and post-synthetic manipulation employed to tailor the materials for use in a variety of commercial acid gas separation systems, with improved performances, recyclability, and reuse characteristics.

20 Claims, 8 Drawing Sheets

(51) Int. Cl.
 B01J 20/30 (2006.01)
 B01J 20/34 (2006.01)
 C07F 3/02 (2006.01)

(52) U.S. Cl.
 CPC ....... B01J 20/3085 (2013.01); B01J 20/3425 (2013.01); B01J 20/3483 (2013.01); C07F 3/02 (2013.01); *B01D 2253/204* (2013.01); *B01D 2257/502* (2013.01)

(58) Field of Classification Search
 USPC ................. 95/115, 139; 96/108; 423/230
 See application file for complete search history.

(56) References Cited

U.S. PATENT DOCUMENTS

| | | | | |
|---|---|---|---|---|
| 2014/0033920 | A1* | 2/2014 | Tate | B01J 20/226 96/108 |
| 2014/0294709 | A1 | 10/2014 | Long et al. | |
| 2015/0027165 | A1 | 1/2015 | Avery et al. | |
| 2015/0173368 | A1 | 6/2015 | Morris et al. | |
| 2017/0087531 | A1 | 3/2017 | Long et al. | |
| 2018/0018541 | A1 | 1/2018 | Wang et al. | |
| 2022/0040668 | A1* | 2/2022 | Weston | B01D 53/02 |
| 2022/0048929 | A1* | 2/2022 | Abney | B01J 20/3475 |
| 2022/0176343 | A1* | 6/2022 | Weston | C07F 13/00 |
| 2023/0159575 | A1* | 5/2023 | Abney | C07F 13/00 556/45 |

OTHER PUBLICATIONS

"In-Flight Carbon Dioxide Exposures and Related Symptoms: Association, Susceptibility, and Operational Implications," Law, J.; Watkins, S.; Alexander, D., NASA/ TP-2010-216126, Jun. 2010.

"EMU LiOH Life Extension Testing," Peters, B.; Westheimer, D.; Hood, K., "48th International Conference on Environmental Systems," 2018.

"Development Status of Amine-based, Combined Humidity, CO2, and Trace Contaminant Control System for CEV," Nalette, T.; Papale, W.; Smith, F.; Perry, J.,"40th Intl. Conf on Environmental Systems," 2006.

"Direct Capture of CO2 from Ambient Air," Sanz-Perez, E. S.; Murdock, C. R.; Didas, S. A.; Jones, C. W., Chem. Rev. 2016, 116, 11840.

"Cooperative Insertion of CO2 in Diamine-Appended Metal-Organic Frameworks," McDonald, T. M.; Mason, J. A.; Kong, X.; Bloch, E. D.; Gygi, D.; Dani, A.; Crocella, V.; Giordano, F.; Odoh, S.; Drisdell, W.; Vlaisavljevich, B.; Dzubak, A. L.; Poloni, R.; Schnell, S. K.; Planas, M.; Lee, K.; Pascal, T.; Wan, L. F.; Prendergast, D.; Neaton, J. B.; Smit, B.; Kortright, J. B.; Gagliardi, L.; Bordiga, S.; Reimer, J. A.; Long, J. R., Nature 2015, 519, 303.

"A Diaminopropane-Appended Metal-Organic Framework Enabling Efficient CO2 Capture from Coal Flue Gas via a Mixed Adsorption Mechanism," Milner, P. J.; Siegelman, R. L.; Forse, A. C.;. Gonzalez, M. 1.; Runcevski, T.; Martell, J. D.; Reimer, J. A.; Long, J. R., J. Am. Chem. Soc., 2017,139, 13541.

"Non-linear waves in chromatography," Helfferich, F. G.; Carr, P. W., Journal of Chromatography, 1993, 629, 97.

* cited by examiner

AQUEOUS MANUFACTURE OF AMINATED MOF COMPLEXES

STATEMENT REGARDING FEDERALLY SPONSORED RESEARCH & DEVELOPMENT

This invention is based upon work supported by the U.S. Department of Energy's Office of Energy Efficiency and Renewable Energy (EERE) under the Advanced Manufacturing Office (AMO) Award Number DE-EE0009419. The Government may have certain rights in the invention.

BACKGROUND

Greenhouse gases generated from anthropogenic emissions, such as the burning of fossil fuels, are the leading cause of global warming due to the greenhouse effect. Carbon dioxide is estimated to be released into the atmosphere at a rate of 40 gigatons per year, making it a major contributor to climate change. The Intergovernmental Panel on Climate Change estimates that in order to stop the current trend of global warming, humans will need to remove 10 gigatons per year by 2050 and 100 gigatons by the year 2100. This process is variously known as either carbon capture and sequestration (CCS) or carbon-capture and utilization (CCU). In one approach, carbon dioxide can be captured from the atmosphere, known as direct air capture (DAC) or from point sources, commonly referred to in the art as point source carbon capture (PSC). Point source carbon capture is generally split into three main categories, pre-combustion capture, post-combustion capture, and oxyfuel combustion capture. The most common and highly developed technologies belong in the post-combustion capture category.

Carbon dioxide from point sources is generally captured using liquid amine-based technology. While this technology has been developed to scale and is selective for acidic gases such as carbon dioxide, there are several drawbacks. Chiefly among them is the energy cost of regeneration of the liquid amines as well as amine degradation. As an alternative to liquid amines, solid adsorbents have been proposed to mitigate the drawbacks of current technology. Metal-organic frameworks (MOFs) are a class of crystalline porous sorbents comprised of metal ions bridged by organic linker units which form a repeating 3-dimensional network. Due to their remarkable properties, such as high surface areas, tunable structure and pore chemistry, MOFs have shown great promise for gas separation applications. However, to date, typical metal-organic framework synthetic routes are costly and energy intensive, requiring expensive solvents, equipment and often high-temperatures and pressures for their preparation. Further, typical solvo(hydro)thermal MOF synthesis results in relatively low yields. Typically, solvo (hydro)thermal (hereinafter "solvothermal") reactions are conducted in closed vessels under autogenous pressure above the boiling point of the solvent. The majority of reported synthetic routes for MOFs describe using solvothermal reactions conducted in polar solvents using closed vessels (autoclaves) at temperatures in the range of 50-260° C. with long reaction times (hours and sometimes days). Teflon-lined autoclaves are generally required for reactions at high temperatures above 400° C. Current approaches typically employ the use of solvents such as dimethylformamide (DMF), implicated in inducing liver toxicity and carcinogenesis, and short chain hydrocarbons, such as n-hexane, which is easily inhaled or absorbed through the skin, and has been recognized to cause long-lasting and even permanent nerve damage in feet, legs, hands, and arms.

Accordingly, there is a need for better a process for the manufacturing of MOFs which does not require the use of large amounts of solvents, high reaction temperatures or pressures, nor the correspondingly complex machinery otherwise employed in the present art. Further, there is a need for an improved solvothermal MOF production process that offers higher yields, at least in the range of 80-90% yields.

In addition, there is a need for a better process for making MOFs that uses less reactant materials, i.e. has greater efficiencies in production, so as to eliminate wasted reactants, solvents and other materials that add to the cost, particularly at larger scales of production. Accordingly, there is a need for an improved means of reducing the amount of polyamine materials needed to produce aminated MOF products from the base MOF materials.

This disclosure, in part, describes the solvothermal synthesis and post-synthetic modification of a family of metal-organic frameworks to be used in an acid gas separation system, such as those used for carbon dioxide. This solvothermal synthetic procedure significantly reduces the large-scale manufacturing costs of metal-organic frameworks.

SUMMARY

Disclosed herein are multiple embodiments of novel functionalized MOFs suitable for the removal of acid gases, particularly carbon dioxide ($CO_2$), which additionally exhibit high water vapor tolerance and stability over thousands of cycles. The MOFs produced by means of the disclosed methods reduce the safety, efficiency, and environmental concerns associated with amine scrubbing techniques while providing high selectivity toward acid gases and negligible uptake of other components, including $CH_4$. Further, the disclosed methods and processes for preparing the exemplary MOFs utilize less toxic solvents, lower levels of reagents, solvents, and use less-energy intensive means for improved environmental impact as well as more readily scaled processes for the production of commercial quantities of the disclosed MOF materials. Additionally, the disclosed methods and processes for preparing the exemplary MOFs may be performed in refluxing water or solvents at ambient pressures, eliminating the need for high pressure apparatus and the resulting complexity and safety issues associated therewith.

In one exemplary embodiment, the present disclosure relates to a process for the preparation of an aminated metal-organic framework product comprising the steps of: (i) obtaining a crude base MOF material by the synthetic means of combining at least one cationic metal salt and at least one polytopic organic ligand in a solvent comprising water, and optionally a first cosolvent and subjecting the resultant combination to stirring and heat for a selected period of time; then (ii) isolating a purified base MOF material obtained from the preceding step by means of rinsing the base MOF material using a cake filter press apparatus in combination with at least one solvent selected from water and an optional cosolvent; and then (iii) optionally, additional filtering and purification of the base MOF material to obtain a purified base MOF material with sufficiently low excess soluble components so as to result in either an acceptable maximum rinse water conductivity or acceptable maximum alkalinity level; followed by the steps of (iv) obtaining an aminated MOF material by means of an amination reaction between a combination of the base MOF material and at least one alkyl-functional amine ligand in a solvent system comprising at least one second cosolvent and subjecting the resultant combination to stirring, and optionally heat if required, for a selected period of time; and then further (v) isolating a purified aminated MOF material obtained from the preceding step by means of using a cake filter press apparatus and optionally rinsing the reaction products with at least one third cosolvent; wherein the first, second and third cosolvents are selected from acetonitrile, ethyl acetate, methanol, ethanol, 1-propanol, and 2-propanol, toluene, and combinations thereof; wherein the polytopic ligand is selected from 4,4'-dioxidobiphenyl-3,3'-dicarboxylate (dobpdc), 4,4"-dioxido-[1,1':4',1"-terphenyl]-3,3"-dicarboxylate (dotpdc), 2,5-dioxidobenzene-1,4-dicarboxylate (dobdc), 3,3'-dihydroxy-4,4'-biphenyldicarboxylate (para-carboxylate-dobpdc), and the respective protonated forms thereof corresponding to each of the preceding materials; wherein the cationic metal salt comprises a salt of a polycationic metal selected from Mg, Ca, Mn, Cr, Fe, Co, Ni, Cu, Zn, Sr, Ba, and Cd, and combinations thereof; wherein the alkyl-functionalized ligand is a polyamine selected from a diamine, triamine and tetramine organic compound, and combinations thereof; and wherein the number of equivalents of the polyamine to the second base MOF material used in the amination reaction is less than 20 eq, or alternatively less than 10 eq, or yet alternatively less than 5 eq.

Also disclosed herein are processes for the preparation and methods of using the disclosed MOF materials in a variety of embodiments.

In one embodiment, a process for the preparation of an aminated metal-organic framework product for the adsorption and desorption of carbon dioxide includes the steps of: (a) obtaining a crude base MOF material by the synthetic means of combining at least one cationic metal salt and at least one polytopic organic ligand in a mixed solvent system comprising water and optionally, a first cosolvent; (b) subjecting the crude base MOF material obtained from the preceding step (a) to stirring and heat for a selected period of time; (c) isolating a purified base MOF material obtained from the preceding step (b) by means of rinsing the crude base MOF material using a cake filter press apparatus in combination with at least one solvent selected from water and a first cosolvent; (d) additional filtering and purification of the purified base MOF material obtained from the preceding step (c) to obtain a filtered and purified base MOF material with sufficiently low excess soluble components so as to result in an acceptable purity parameter value; (e) obtaining an aminated MOF material by means of an amination reaction between a combination of the filtered and purified base MOF material obtained from step (d) and at least one alkyl-functionalized amine in a solvent system comprising at least one second cosolvent; (f) subjecting the resultant aminated MOF material obtained from the preceding step (e) to a combination of stirring, and optionally heating, for a selected period of time; and finally (e) isolating a purified aminated MOF material obtained from the preceding step (f) by means of rinsing the reaction products thereof using a cake filter press apparatus in combination with at least one third cosolvent.

In a related embodiment, the acceptable purity parameter is selected from a minimum free cationic metal salt residual level, a minimum free polytopic organic ligand level, a maximum rinse water conductivity, a maximum alkalinity level, and combinations thereof. In further embodiments, the first, second and third cosolvents are selected from acetonitrile, ethyl acetate, toluene, methanol, ethanol, 1-propanol, and 2-propanol, and combinations thereof, or alternatively selected from solvents exhibiting a dielectric constant of 5 to 40, and a Reich polarity index of 2 to 8, or yet alternatively selected from solvents exhibiting a flash point greater than −20° C. and less than 25° C., and a boiling point of less than 85° C., including combinations of a first, second and third cosolvents thereof in any proportion.

In related embodiments, the polytopic ligand is selected from 4,4'-dioxidobiphenyl-3,3'-dicarboxylate, 4,4"-dioxido-[1,1':4',1"-terphenyl]-3,3"-dicarboxylate, 2,5-dioxidobenzene-1,4-dicarboxylate, and 3,3'-dihydroxy-4,4'-biphenyldicarboxylate, and the respective protonated forms thereof, and combinations thereof, and the cationic metal salt is a salt of a polycationic metal selected from Mg, Ca, Mn, Cr, Fe, Co, Ni, Cu, Zn, Sr, Ba and Cd, and combinations thereof, and the alkyl-functional amine is a polyamine selected from a diamine, triamine and tetramine organic compound, and combinations thereof.

In some embodiments, the number of molar equivalents (eq) of the polyamine with respect to the filtered and purified base MOF material in step (e) hereinabove used in the amination reaction is less than 20 molar equivalents, or alternatively, less than 10 molar equivalents, or yet alternatively less than 5 molar equivalents.

In further embodiments, the purified aminated MOF material obtained from step (e) hereinabove exhibits a bimodal carbon dioxide isotherm having a molar adsorbance limit of 1 mol/mol with respect to the carbon dioxide and the alkyl-functional amine that occurs at a temperature below 50° C., or alternatively below 40° C. a In related embodiments, the disclosed processes produce a purified aminated MOF material that exhibits a high temperature isobar adsorption step as determined by TGA between 100 to 150° C., and also exhibits a low temperature isobar adsorption step between 50 to 80° C., or yet alternatively a high temperature isobar adsorption step as determined by TGA between 110 to 130° C., and also exhibits a low temperature isobar adsorption step between 60 to 75° C.

In related embodiments, the disclosed processes produce a purified aminated MOF material that exhibits a single modal (sigmoidal) carbon dioxide isobar adsorption step as determined by TGA between 70 to 90° C., and a molar adsorbance limit of 1 mol/mol with respect to the carbon dioxide and the alkyl-functional amine that occurs at a temperature below 50° C., or alternatively at a temperature below 35° C.

Other contemplated embodiments of the disclosure include a method of using a purified aminated MOF materials obtained using the process of claim 1 to first (i) adsorb carbon dioxide from an environment, and then secondly (ii) desorb carbon dioxide into a containment means isolated from the environment. In yet another closely related embodiment the purified aminated MOF materials are used in successive repeated steps of a first step (i) and a second step (ii) to control and maintain a desired carbon dioxide level in the environment by means selected from first cooling and then heating the purified MOF materials, respectively.

Further embodiments include using, as appropriate to the environment to be treated, purified aminated MOF material that exhibit a single modal (sigmoidal) carbon dioxide isotherm, a bimodal carbon dioxide isotherm, and combinations of the MOF materials thereof. One non-limiting exemplary embodiment includes combinations of a single and bimodal exhibiting MOF materials are selected to obtain a resultant mixture that exhibits a high temperature isobar adsorption step as determined by TGA between 100 to 150°

C., a low temperature isobar adsorption step between 50 to 80° C., and a molar absorbance limit of carbon dioxide below 50° C.

Further embodiments of the present disclosure are described in detail hereinbelow by means of the textual description and drawings attached to this application.

Figure 1:
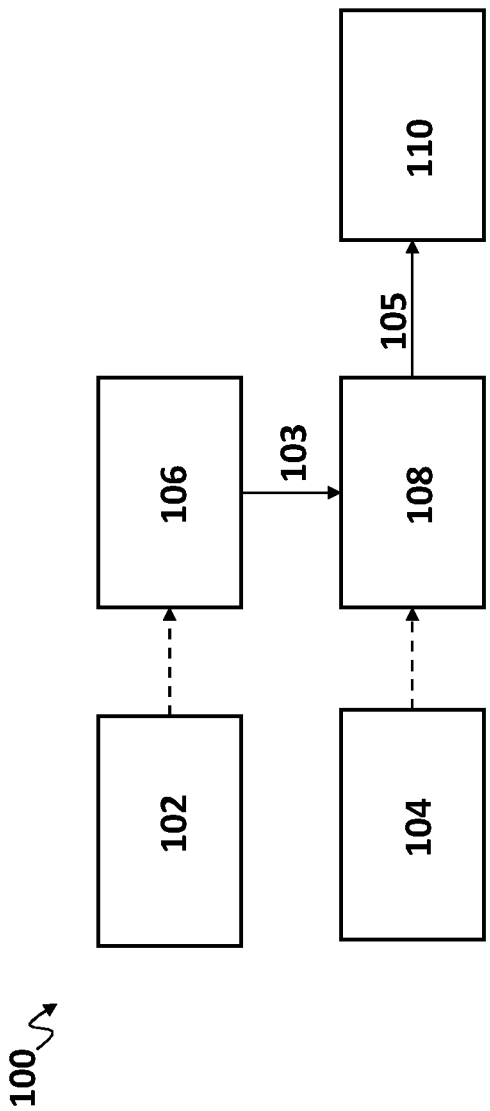
FIG. 1 shows one embodiment of an illustrative process flow diagram for the preparation of a MOF sorbent product.

A corresponding key detailing the specific process steps, materials, methods and means of preparing embodiments of the present disclosure accompany each of the above Figures and are presented in an Appendix, attached hereto, and incorporated entirely herein by reference.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to reasons for using particular techniques do not preclude other reasons or techniques, even if completely contrary, where circumstances would indicate that the stated reasons or techniques are not as applicable.

References to contemplated causes and effects for some implementations do not preclude other causes or effects that might occur in other implementations.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to "percent" or "%" generally refer to weight percent ("weight %" or "wt %") unless a volume percentage is specified.

References to "ppm" generally refer to parts-per-million.

References to "yield" or "theoretical yield" generally refer to the ideal or theoretical reaction yield or recovery of the anticipated product expressed as a percentage of the theoretical maximum yield or maximum recovery, respectively.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

DETAILED DESCRIPTION

The present disclosure includes improved methods and processes for preparing an aminated MOF material with excellent direct air capture (DAC) properties and/or point source carbon capture (PSC) applications with respect to carbon dioxide separation and recovery, having the advantages of employing safer solvents and more favorable process conditions that reduce time and energy spent in production, and which are more readily scalable over quantities of grams to multiple kilograms of product. The present disclosure describes solvothermal processes that employ less expensive, safer, less toxic, and more environmentally favorable solvents for the preparation of base MOF and aminated MOF materials that can be readily transformed into suitable product forms for industrial usage by simpler mechanical means, such as for example by employing filter plate press extraction and filtration means, rather than centrifugation or vacuum filtration.

The present disclosure includes improved methods and processes for preparing and isolating purified aminated MOF materials at high yield levels exceeding 80-90% yield.

FIG. 1 shows one embodiment of a general MOF sorbent process (100) illustrated in diagrammatic form wherein a source of premanufactured MOF precursors (102) are selected to manufacture a base MOF support (106) material in a first step, which is then combined in a second synthetic step (103) with a source of premanufactured alkyl-functionalized amine ligands (104) to form an aminated MOF support (108) material. The aminated MOF support (108) material is then subjected to at least one purification and MOF isolation step (105) to obtain an amine functionalized MOF sorbent product (110). Depending on the nature of the MOF precursors (102), amine ligands (104) and the parameters of the MOF support preparation (103) process, the resulting MOF sorbent 110 may be optimized for either direct air capture (DAC) or for point source carbon capture (PSC) processes. Accordingly, in one embodiment, MOF precursors (102) are selected from materials capable of forming a metal-organic framework (MOF) with a porous structure capable of being further modified to produce a MOF product with desired properties for direct air capture, or alternatively in a related embodiment to produce a MOF product with desired properties for point source carbon capture. In another embodiment, amine ligands (104) are selected from materials capable of amination of the base MOF material to produce a MOF product with desired properties for DAC applications, or alternatively in a related embodiment to produce a MOF product with desired properties for PSC applications.

In further embodiments, both the MOF support preparation (103) step and the MOF isolation step (105) can be controlled by means of the selection and application of process parameters during these steps including: (i) choice of materials, including but not limited to choice of metal salt, polytopic organic linker, deprotonating base, ligand, polyamine ligand, animation solvent, exchange solvent, rinsing/purification solvent, granulation solvent, and binder; (ii) relative scale of method, including but not limited to relative amount of solids content (polytopic organic linker, metal salt, amination ligand, binder and optional adjuvant), solvents per unit mass, and solvent volumes; (iii) reaction component ratios, including but not limited to metal-to-ligand ratio, ratio of deprotonating base to ligand, solvent-solvent ratios and MOF to binder ratio; (iv) reaction conditions, including but not limited to the temperatures of base MOF formation, amination temperature, reaction volumes, stir rate, reaction time, heat transfer rate, gas-drying flow rates, gas volumes and drying times; (v) post MOF product processing parameters, including but not limited to filter bed oscillation conditions such as oscillation rate, shaking time and screen size; (vi) granulation parameters, including but not limited to initial and final degree of wetness, granulation stirring and chopper speed, granulation mixing time; and (vii) extrusion parameters, including but not limited to extrusion rate, extrusion orifice size, orifice shape, extrudate density, initial and final degree of extrudate wetness, and drying time of extrudate.

In further embodiments, isolation and recovery parameters include, but are not limited to initial purity of the materials employed, yield and recovery efficiency of base MOF, aminated MOF, isolated MOF sorbent and binder-modified MOF product, as well as the final yield of aminated MOF extrudate product in ready-to-use form.

The MOF precursors (102) contemplated in embodiments of the present disclosure include the use of multivalent (charge n+) metal cations ($M^{m+}$) selected from the Group II elements and transition metals, which include, but are not limited to Mg, Ca, Mn, Cr, Fe, Co, Ni, Cu, Zn, Sr, Ba, Cd, and combinations thereof, and which are capable a multivalent ionic bond with a receptive organic compound, and including the salts thereof as combined with suitable anionic counterions.

In some embodiments, $M^{m+}$ includes elements selected from periodic groups IB, IIA, IIB, IIIA, IVA, IVB, VIB, VIIB, or VIII. In some embodiments, $M^{m+}$ includes elements selected from periodic groups IIIA, IIIB, IVB, VB, VIB, or VIII. In some embodiments, $M^{m+}$ may include elements selected from periodic groups IB, IIA, IIB, IIIA, IVA, IVB, VIB, VIIB, or VIII. In some embodiments, $M^{m+}$ can include one of the following cations: $Zn^{2+}$, $Co^{2+}$, $Ni^{2+}$, $Mn^{2+}$, $Zr^{2(2+,\ 4+)}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$ and $Co^3$. In some embodiments, $M^{m+}$ can be one of the following $Al^{+3}$, $Fe^{+2}$, $Fe^{+3}$, $Cr^{2+}$, $Cr^{3+}$, $Ti^{3+}$, $V^{3+}$, $V^{(+2\rightarrow 5)}$, $Sc^{3+}$, $In^{3+}$, $Nb^{5+}$, $Y^{3+}$, as well as combinations thereof.

Generally, any anionic counterion is tolerated providing it renders the metal cation salt water soluble. Accordingly, in some embodiments, suitable counterions include acetate, citrate, chloride, bromide, sulfate, bisulfate, hydrogen sulfate, sulfonate, bisulfonate, hydroxide, nitrate, phosphate, perchlorate, tetrafluoroborate, hexafluorophosphate, sulfide, p-toluenesulfonate (and alkyl derivatives of sulfonate), formate, bicarbonate, carbonate, chromate, chlorate, bromate, iodate, borate (tetraphenyl and other derivatives or borate), bistriflimide (bis(trifluoromethane) sulfonimide), nitrite, sulphite, and combinations thereof, including anhydrous and hydrated forms of these metal salts and metal counterions.

Additional MOF precursors (102) contemplated in embodiments of the present disclosure include receptive organic compounds selected from polytopic organic linkers capable of forming ionic interactions with the selected metal cations. Suitable polytopic organic linkers include, but are not limited to the group consisting of 4,4'-dioxidobiphenyl-3,3'-dicarboxylate (dobpdc), 4,4"-dioxido-[1,1':4',1"-terphenyl]-3,3"-dicarboxylate (dotpdc), 2,5-dioxidobenzene-1,4-dicarboxylate (dobdc), 3,3' dioxide-biphenyl-4,4'-dicarboxylate (para-carboxylate-dobpdc), and the respective protonated forms thereof corresponding to each of the preceding materials.

Alkyl-functionalized amines suitable for use herein in the various embodiments disclosed include polyamine organic compounds selected from, but not limited to, diamine, triamine, and tetramine organic compounds.

Suitable polyamines include, but are not limited to, diethylenetriamine, N-(2-aminoethyl)-1,3-propanediamine, bis(3-aminopropyl)amine, N-(3-aminopropyl)-1,4-diaminobutane, triethylenetetramine, N,N'-bis(2-aminoethyl)-1,3-propanediamine, 1,2-bis(3-aminopropylamino)ethane, N,N'-bis(3-aminopropyl)-1,3-propanediamine, N,N'-bis(3-aminopropyl)-1,4-diaminobutane, tetraethylenepentamine, and combinations thereof.

Suitable diamines include, but are not limited to, ethylene diamine, butylethylenediamine, N-methylethylenediamine, N-ethylethylenediamine ("e2"), N,N-dimethylethylenediamine, N,N-diethylethylenediamine, di(N-methyl)ethylene diamine, N-isopropylethylenediamine ("i2"), N,N-dimethyl-N-methylethylene diamine, di(N,N-dimethyl)ethylene diamine, N,N-diisopropylethylene diamine, 2,2-dimethyl-1,3-diaminopropane ("3bb"), 1,3-diaminopentane ("3ae"), and combinations thereof. The structures of these diamine ligands are shown in Table 1, hereinbelow.

TABLE 1

Name, structure, and abbreviation for diamines appended to the base MOF framework presented herein.

| Diamine Name | Structure | Abbreviation |
|---|---|---|
| 2,2-dimethyl-1,3-diaminopropane | $H_2N\diagup\hspace{-6pt}\diagdown NH_2$ | 3bb |

TABLE 1-continued

Name, structure, and abbreviation for diamines appended to the base MOF framework presented herein.

| Diamine Name | Structure | Abbreviation |
|---|---|---|
| N-ethylethylenediamine | CH₃CH₂-NH-CH₂CH₂-NH₂ | e2 |
| N-isopropylethylenediamine | (CH₃)₂CH-NH-CH₂CH₂-NH₂ | i2 |
| 1,3-diaminopentane | H₃C-CH(NH₂)-CH₂-CH₂-NH₂ (with ethyl branch) | 3ae |

Suitable triamine ligands are selected from, but are not limited to, 3-3 [bis(3-aminopropyl)amine], 3-4 [N-(3-aminopropyl)-1,4-diaminobutane], 6-tris(4-(1H-tetrazol-5-yl)phenyl)-1,3,5-triazine-2,4,6-triamine), and combinations thereof.

Suitable tetramine ligands are selected from, but are not limited to, N,N'-bis(3-aminoethyl)-1,3-diaminoethane, N,N'-bis(3-aminoethyl)-1,3-diaminopropane, N,N'-bis(3-aminopropyl)-1,3-diaminoethane, N,N'-bis(3-aminopropyl)-1,3-diaminopropane, N,N'-bis(3-aminopropyl)-1,4-diaminobutane, and combinations thereof. The corresponding structures and abbreviations being shown in Table 2, shown herein.

Further embodiments contemplate the use of other di-, tri- and tetra-amines not specifically listed herein, but which are suitable for use in functionalizing the MOF materials disclosed.

TABLE 2

Name, structure, and abbreviation for tetramines appended to the base MOF framework presented herein.

| Tetramine Name | Structure | Abbreviation |
|---|---|---|
| N,N'-bis(3-aminoethyl)-1,3-diaminoethane | H₂N-CH₂CH₂-NH-CH₂CH₂-NH-CH₂CH₂-NH₂ (2-2-2) | 2-2-2 |
| N,N'-bis(3-aminoethyl)-1,3-diaminopropane | H₂N-CH₂CH₂-NH-CH₂CH₂CH₂-NH-CH₂CH₂-NH₂ (2-3-2) | 2-3-2 |
| N,N'-bis(3-aminopropyl)-1,3-diaminoethane | H₂N-CH₂CH₂CH₂-NH-CH₂CH₂-NH-CH₂CH₂CH₂-NH₂ (3-2-3) | 3-2-3 |
| N,N'-bis(3-aminopropyl)-1,3-diaminopropane | H₂N-CH₂CH₂CH₂-NH-CH₂CH₂CH₂-NH-CH₂CH₂CH₂-NH₂ (3-3-3) | 3-3-3 |
| N,N'-bis(3-aminopropyl)-1,4-diaminobutane | H₂N-CH₂CH₂CH₂-NH-CH₂CH₂CH₂CH₂-NH-CH₂CH₂CH₂-NH₂ (3-4-3) | 3-4-3 |

In further embodiments of the present disclosure, the second synthetic step (103) and the purification and isolation step (105) shown in FIG. 1 further include a plurality of additional substeps employed to purify intermediate MOF materials as well as purify and isolate the final aminated MOF products in suitable physical form for subsequent use in the desired carbon sequestration processes.

Figure 2:
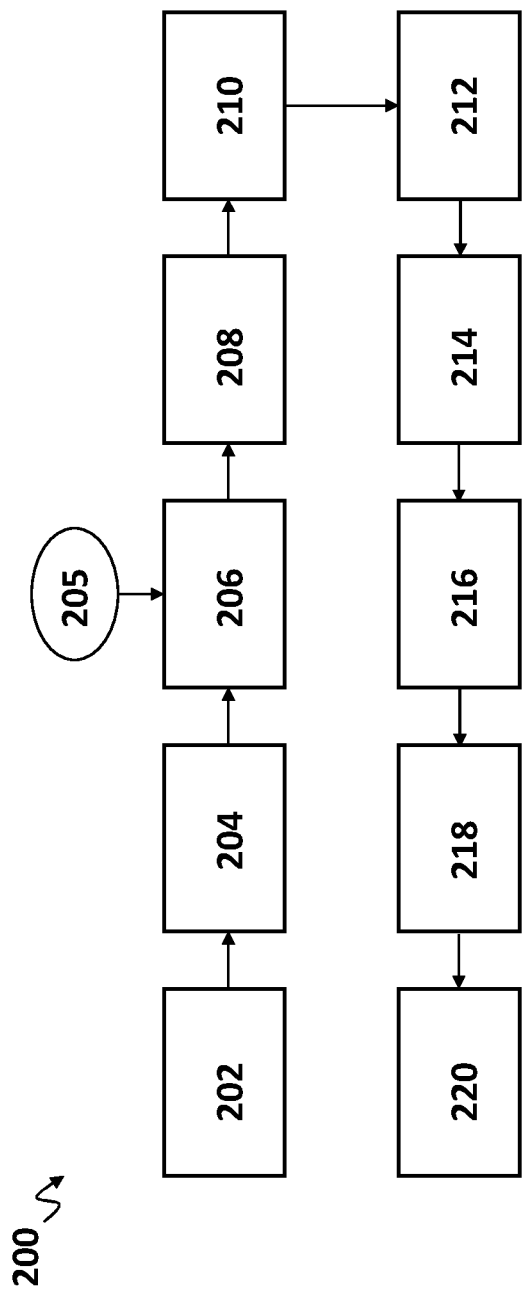
FIG. 2 shows one embodiment of an illustrative process flow diagram for the preparation, isolation, and manufacture of a MOF sorbent product.

FIG. 2 shows one embodiment of a general MOF sorbent preparation process (200) illustrated in diagrammatic form wherein a base MOF precursor is first synthesized in a base MOF synthesis step (202) employing at least one material selected from a multivalent metal cation as disclosed herein and at least one polytopic organic linker as disclosed herein. Once the base MOF synthesis step (202) is completed, the resulting base MOF materials are then subjected to at least one filtration and/washing step (204) to remove unreacted and excess reagents. Alternatively, a centrifugation step may also be employed to separate unreacted or excess reagents as well. Subsequently, at least one amine ligand source (205) is selected from a suitable polyamine organic ligand as disclosed herein, and is combined with the filtered base MOF material resulting from step 204 in an animation reaction (206) to produce an amine-functionalized MOF material. The amine-functionalized MOF material is then subject to a filtration (208) step to obtain an isolated wet aminated MOF (210) product. At production level scales, the resulting product 210 is usually obtained in the form of a wet filter cake as a result of using a filter plate press machine, which have been specifically repurposed herein to enable the handling and processing of larger amounts of MOF particulate materials in combination with the use of safer and less toxic solvents and solvent combinations. At bench level scales of synthesis, granular ("depth") filtration (either via gravity or vacuum assisted) is typically used for clarifying suspensions of the more dilute particle concentrations being handled. In contrast, cake filtration is preferentially applied herein to suspension or slurries of high particle concentrations resulting from more concentrated preparations suitable for producing larger quantities of the MOF materials. The utilization of a filter cake press enables larger scale production and dramatically improves the efficiency and overall yield of materials produced, as well as providing an improved means to clean and purify the resulting products more effectively; with the additional advantages of doing so with lower energy costs and reduced timing. The disclosed process means, filter press equipment and methods of use relating to the various embodiments of the present disclosure are enabled by the use of less toxic solvents that do not require strict containment and handling means compared to solvents currently used in the art to synthesize and process MOF materials.

The wet aminated MOF (210) material is then subjected to at least one drying step (212) to remove excess water and solvents, resulting in a dried solid aminated MOF product which is typically in the form of a large cake or large chunks. These isolated solids may be mechanically reduced in size by some means including, but not limited to, crushing, ball milling, compression rolling, oscillatory screening, and the like, and then processed by some means to obtain a granular or powdered form of the material in a size screening step (214). At higher scale levels including multi-kilogram levels of manufacture, crushers are widely used as a primary stage to produce the particulate product finer than about 50-100 microns. Suitable crushers include jaw, gyratory, and cone crushers based on compression, cutter mill based on shear, and hammer crusher based on impact to fragment caked materials and reduce the particles size thereof. However, crushers also exhibit a tendency to produce very fine dust particles that are more difficult to control, handle and recover. Accordingly, at intermediate and larger-scale levels, oscillatory screening may be employed to reduce caked materials to the desired particle size ranges, the process introducing sufficient mechanical energy to effectively abrade and reduce particles as well as to screen the materials to a desired average particle size range, depending on the screen sizes used. Accordingly, in selected embodiments of the present disclosure, the use of oscillatory screening equipment is preferred as this approach provides for the effective reduction to desired particle size distributions and the easier separation of desired particles sizes with the concomitant reduction in dust and finer particles being produced as compared to the use of crushers.

Following at least one size screening step (214), a suitable binder and binder level is selected and combined with the dried MOF material in an optional binder addition step (216). This steps intimately mixes the materials, with the object of obtaining a fairly homogeneous mixture of the two materials suitable for further processing.

Depending on the desired ultimate properties of the amine-functionalized MOF, a binder may or may not be needed. However, the addition of a binder may be used to improve the heat, handling, storage, transport, and mechanical stabilities of the MOF materials in their desired final physical form. In embodiments of the present disclosure, the type and level of binder employed may be selected in order to optimize the final MOF material for use in either DAC and/or PSC applications. Suitable binders include, but are not limited to: (i) polymers such as for example polyvinyl alcohol (PVA); (ii) clays (hydrous alumino silicates) such as for example chlorite, kaolin, pyrophyllite, smectite and illite; (iii) polysaccharides, such as for example fructose, glucose, sucrose and starch; (iv) biopolymers such as for example cellulose and chitosan; (v) silicone polymers such as for example siloxanes and silicone resins; and (vi) metal oxides, such as for example silica ($SiO_2$) titania ($TiO_2$) and alumina ($Al_2O_3$), and in particular for example mesoporous r-alumina, aluminum fumarate ($AlO_4(OH)_2(C_4O_4)$), and combinations thereof, and combinations of the (i)-(vi) materials.

Following the addition of a suitable binder to the isolated MOF material, the resulting mixture may then be subjected to a granulation step (218) which enables the intimate interaction of the MOF material with the selected binder to occur, generally in the presence of a liquid adjuvant to produce a concentrated paste or slurry. In one embodiment, the liquid adjuvant is water or a dilute alkaline hydroxide solution capable of initially solubilizing or suspending the materials to enable intimate interaction of the MOF material and binder. In embodiment employing a granulation step (218), the resulting slurry may then be dried, resulting in a cake or particulate collection that can be dried and used or re-sized as desired, or alternatively subject to an extrusion step (220) prior to drying. In related embodiment, following either of the preceding approaches disclosed, the resulting cakes, particles or extruded forms of the final material may be further subjected to a final sizing step (not shown) in order to obtain the desired particle shapes and sizes desired, which can be selected by adjusting the related process parameters as needing in anticipation of the ultimate intended use of the materials for acid-gas sequestration purposes.

EXPERIMENTAL DETAIL

Experimental details are now disclosed hereinbelow illustrating additional embodiments and inventive steps suitable for use in preparing MOF products intended for use in an industrial process to sequester acid gases, and in particular carbon dioxide. To prepare an exemplary MOF material at process level quantities, a three step experimental procedure was conducted, comprising the steps including a (1) first synthesis of an non-modified or base MOF; followed by (2) amination of the base MOF to obtain a modified aminated MOF (amino-functionalized or amine-appended MOF); and a final (3) granulation and/or combined extrusion step to obtain an aminated MOF in a form suitable for use in a desired carbon-sequestration process.

Accordingly, the following procedures were employed for preparing a batch level of approximately 1.8 kilograms (kg) weight size of an exemplary MOF material according to the present disclosure.

In a first synthetic step, the following materials (and amounts indicated) where used, including magnesium acetate tetrahydrate (1643.99 g), sodium hydroxide (550.56 g), organic linker DOBPDC (depronated DOBPDC or 4,4'-dihydroxy-(1,1'-biphenyl)-3,3'-dicarboxylic acid, 930.87 g), N-butylethylenediamine (1187.83 g), deionized (DI) water (96 L), methanol (MeOH) solvent (80 L) and acetonitrile (38 L).

The preparation was conducted using one each of a 50 L glass reaction vessel, 10 gal HDPE (high density polyethylene) batch can, diaphragm pump and a Mudhen filter plate press model Mudhen 1.0 (MH-1) obtainable from several commercial suppliers, including Industrial Contractors Supplies, Inc., located at 15061 Route 30, N. Huntingdon, PA 15642 USA, and utilizing a polypropylene filter media fully resistant to the solvents employed herein.

Analytical devices employed to monitor the progress and results of the various synthesis steps included a generic conductivity and pH probe, a Micromeritics Tristar brand gas adsorption analyzer for conducting BET (referring to Brunauer, Emmett and Teller theory for measuring specific surface area) measurements, and a TA Instruments thermal gravimetric analyzer, available from the Micromeritics Instrument Corporation, located at 4356 Communications Dr, Norcross, GA 30093, USA, and TA Instruments, located at 159 Lukens Drive, New Castle, DE 19720, USA, respectively.

A first process step to obtain the base MOF consisted of a solvothermal reaction under continuous reflux conditions of deprotonated organic linker and magnesium acetate in the 50 L glass reactor. Here, the 50 L glass reaction vessel was charged with DI (deionized) water (13.43 L) to which sodium hydroxide (550.56 g) was then slowly added and dissolved via stirring. Once dissolved, organic linker DOBPDC (930.87 g) was slowly added, after which the reaction mixture was allowed to stir for about fifteen minutes. To this stirred solution, additional reagents were added from the 10 gallon HDPE batch can that had been previously charged with DI water (12.57 L) and magnesium acetate (1643.99 g) then added, first having been dissolved via stirring and transferred using a diaphragm pump to the 50 L reactor. Once added, the 10-gallon HDPE batch can was rinsed with DI water (1 L), the rinse water also then being pumped into the 50 L reactor vessel so that no materials were wasted.

In this and related embodiments, the 50 L reactor vessel included an attached reflux condenser that was cooled using ambient temperature circulating water. After all accessory ports on the reactor were closed or sealed, the reaction mixture was then refluxed at a temperature of about 101° C. for one hour, achieved by means of attaching a heating jacket with a controller, which was set to a temperature of about 110° C. The reaction mixture was stirred at approximately 130 rpm (revolutions per minute) for one hour, after which the heat was turned off and heating jacket removed. The reaction mixture was then cooled to about 65° C. by the addition of DI water (27 L). In other related embodiments, the added DI water can be prechilled in order to speed the cooling step.

After cooling, the mixture was then filtered using a Mudhen filter plate press. In related embodiments, any suitable filter plate press may be employed. The inlet hose of the Mudhen press was attached to the bottom of the 50 L reactor vessel using a sanitary fitting, while the outlet hose from the Mudhen press was positioned for flow into the 50 L reactor. A compressed air supply (80 psi) was attached to the Mudhen using quick connectors for convenience and for the purpose of pressurizing the system. Once the Mudhen was turned "ON," air was introduced slowly using a regulator valve to achieve a pressure in the range of between 20 to 30 psi, and the slurry was clarified for about 5 to 10 minutes, or until substantially clear in appearance. Once the slurry clarified, the Mudhen was turned "OFF" and the outlet valve tubing redirected to a waste container. An initial conductivity and pH measurement of the clarified material was then obtained, showing a conductivity of 18.0 mS/cm (+/−5) and a pH of about 9 (+/−2 units), thus exhibiting a typical initial conductance indicative of the need for further purification.

Once the 50 L reactor was empty, the inlet hose was disconnected and placed inside a 10-gallon HDPE batch can containing about 42 L of DI water (42 L), and the filter cake was then washed with a total of about 38 L of DI water, measurements taken intermittently after flowing approximately 15, 23, 30, and finally the balance of 38 L until a final desirable conductivity of about 1 mS/cm and a pH of 9 (+/−2 units) was obtained, this being an acceptable conductance value and suitable pH indicative of sufficient purification of the material in the filter cake, soluble salts and other non-reactive materials having been substantially removed.

At this stage, the inlet hose was removed from the 10-gallon HDPE batch can and allowed to pump for 5 minutes, under a regulated pressure of about 20 psi. Once finished, a nitrogen gas line was connected to the Mudhen via a quick connect coupling. The Mudhen was then switched to "DRY" mode and the filter cake exposed to a blowdown with nitrogen gas for fifteen minutes, using a regulator pressure of about 14 psi. After fifteen minutes, methanol (60 L) from the 10-gallon HDPE batch can was pumped through the Mudhen filter plate press to remove water from the cake. The inlet hose was then removed from the methanol batch can and allowed to pump for five minutes, using a regulator pressure of about 20 psi. The Mudhen was maintained on "DRY" and the methanol-solvated filter cake exposed to a blowdown with the nitrogen gas for fifteen minutes using a regulator pressure of about 14 psi. After about fifteen minutes the Mudhen was opened, and filter cake was transferred into pre-weighed tray, and the initial solvated filter mass was recorded.

The filter cake was then transferred into a 10-gallon HDPE batch can, and 20 L of methanol added. The resulting MOF slurry was then manually mixed using a portable paddle until uniform in consistency and allowed to soak overnight. After approximately 24 hours, the MOF slurry was filtered using the Mudhen filter plate press, with the inlet hose submerged into the 10-gallon HDPE batch can and the outlet tube attached also thereto in order to allow for recirculation of the solvent. Once the slurry has clarified, the outlet tube was attached to a waste container for collection and the pumping continued for five minutes. At this stage, the Mudhen was switched to "DRY" and the filter cake exposed to a blowdown with nitrogen gas for fifteen minutes, using a regulator pressure of about 14 psi. About 19 L of acetonitrile solvent (ACN) was then added to the 10-gallon HDPE batch can. The acetonitrile was filter-recirculated for five minutes until all the MOF/acetonitrile solution was exchanged with the methanol. The Mudhen was switched to "DRY" and the filter cake exposed again to a blowdown with nitrogen gas for an additional fifteen minutes using a regulator pressure of about 14 psi. The nitrogen supply was then shut off and the Mudhen was opened, enabling MOF material to be scraped from the surface of the filter plates and recovered into a catch pan.

At this stage, a BET surface area analysis was performed on a small aliquot of the base MOF for sampling purposes (about 0.1-0.3 g), after it had been thermally activated at 400° C. under vacuum for one hour. Continuing with the process, the 50 L reactor vessel drain valve was closed, and the reactor then loaded with the filtered and rinsed MOF base material (about 1,076 g) remaining in the catch pan. About 19 L of acetonitrile was then added to the 50 L reactor and the resulting slurry was then mixed thoroughly and an initial temperature recorded. With continued mixing, N-butylethylenediamine (1187.8 g) was then added to the 50 L reactor and reacted for about 1.5 hours. Typical mixing speeds were 120 rpm. An exothermic reaction was typically observed, and a final temperature was then recorded. The resulting aminated MOF slurry was then filtered via the Mudhen filter plate press, where the inlet hose was attached to the bottom of the 50 L reactor via the sanitary fitting, the outlet tubing from the Mudhen was attached inside the 50 L reactor, and a nitrogen supply (80 psi) was attached to the Mudhen via quick connectors. Once the Mudhen was turned ON, nitrogen was introduced slowly via the regulator valve over a range of 20-30 psi, and the slurry was then allowed to clarify for between 5-10 minutes, or until clear in appearance. Once clear, the Mudhen was set to "OFF" and the outlet drain valve tubing was redirected to a waste container. Once connected, effluent was discarded and pumped for five minutes using a regulator pressure of about 20 psi.

Repeating the procedure employed in the earlier recovery process detailed hereinabove, the Mudhen was then switched to "DRY" and the filter cake subjected to a blowdown with nitrogen gas for fifteen minutes using a regulator pressure again of about 14 psi. Following this step, the nitrogen supply was then shut off and the Mudhen was opened, enabling aminated MOF material to be scraped off the filter plate surfaces and recovered into the catch pan. The wet aminated MOF material was then distributed evenly over drying trays, the solvent drying oven was set to 40° C. with a nitrogen gas flow of about 15 SCFH (standard cubic feet per hour) and the material was allowed to dry for about two days.

After recovery of the dried aminated MOF cake material, it was broken into smaller pieces suitable for introduction to the milling machine, whose oscillator was configured with a 22 US size mesh screen. Before the operation was started, a 2 mm-thick polyethylene bag was secured around the outlet of the oscillation screen to collect oscillated material, and the oscillator was loaded with the aminated MOF. After sized millings were collected, the weight of recovered material was recorded and thermogravimetric analysis (TGA) was used to determine any residual solvent content in the dried and sized aminated MOF material, which typically retained about 10-15% solvent by weight.

For quality control, it is desirable to measure incipient wetness of the material. To that end, the incipient wetness of a small aliquot (about 1 g) of the oscillated aminated MOF powder was determined by adding a 0.1 M NaOH solution dropwise until a "puddle point" was reached, at which point excess alkaline solution was no longer absorbed by the material and started to visibly collect on the surface. A simple calculation to determine a numeric incipient wetness value at the puddle point was obtained by dividing the amount of 0.1 M NaOH solution added (in mL) by the mass of aminated MOF (g) used. Typically, the value for the incipient wetness was between 2-3 mL/g. In this specific synthesis, a value of 2.57 mL/g was obtained.

Next, the amount of binder/additive material to be added was determined based on the final weight percent of aminated MOF content desired. Here, the MOF solid content measured via TGA methodology was used as a parameter to determine the level of binder to be added. Following this particular embodied synthesis, a 10% binder/90% MOF (10:90) product was determined to be the desired target, the MOF solid content measured using TGA having been determined to be about 88.97 wt %. Accordingly, using a batch size of about 150 g of the aminated MOF solid, the amount of actual MOF present was determined to be 133.45 g (150 g×88.97%/100%) indicating that the desired mass of binder to be added was about 14.83 g (10%/100%×133.45/0.90).

Further, in the disclosed embodiments herein, it is desirable to control the moisture level of the aminated MOF prior to addition of the binder. In this example embodiment, a moisture level of 50% was targeted. To then calculate the requisite amount of 0.1 M NaOH aqueous solution to be added to achieve that moisture content of 50%, the incipient wetness value determined earlier was employed, providing an amount of about 205 mL (150 g MOF×2.57 m L/g×50%/100%) to be used.

Using this calculation, about 150 g of the aminated MOF powder was placed into a granulation bowl, binder added (14.83 g), followed by the addition of 205 mL of the 0.1 M NaOH solution by means of addition using tubing and a peristaltic pump to enable thorough contact and mixing. The granulator settings employed were a mixer speed of 400 rpm and a chopper speed of about 1800 rpm, the peristaltic pump delivering the entire aliquot of alkaline solution in sufficient time to enable an overall pre-mix stir time of 30 seconds and a post-mix stir time of about 90 seconds. The alkalized granulated aminated MOF was then extruded into a final physical form using an extruder fixed with a 1 mm die and operated at a power setting of 20 rpm. Extrudates were collected onto a stainless steel tray and then transferred into a vacuum oven and maintained under a nitrogen gas flow at 40° C. prior to sampling and testing. After a short time, a sample was removed to enable both density measurements and hardness tests to be conducted on the extrudates. Typical ranges for density were between 0.4-0.7 g/cm$^3$. Typical ranges for hardness were determined to be between 3-20 N/mm, a minimum value being 3 N/mm.

The overall recovery or yield of product is an important parameter to monitor and as a metric to improve the efficiency of the synthetic, purification and recovery steps disclosed herein. At bench scales, typical yields of the base MOF material range from 50 to 95%, depending on the materials and care in preparation and handling. As scale is increased, some inefficiencies in reaction are normally anticipated due to mass transfer, mixing and energetic conditions and timing associated with bringing the reactants into intimate content and providing sufficient energy and time for them to fully interact. Accordingly, at kilogram sizes, yield of the base MOF is generally observed to be in the range of 60-95%, or alternatively between 70-90%, or yet alternatively between 75-85%.

Recovery of the final aminated product, after aminomodification of the first recovered base MOF, is generally very good at bench scale quantities, theoretically being 100%. In practicality, the same issues with synthesis, purification and recovery apply as well in the preparation of the aminated MOF products. Accordingly, at kilogram sizes, yield of the aminated MOF product is generally observed to be in the range of 60-95%, or alternatively between 70-90%, or yet alternatively between 75-85%. In the various embodiments presented herein, the typical recovery of aminated MOF material following synthesis and cleaning/purification by means of the filter press step, but prior to further processing, was found to be between 60-80% of theoretical yield.

A surprising discovery in evaluating synthetic efficiency and yield was the dramatically improved degree of amination of the base MOF material using embodiments of the solvothermal process disclosed herein. Generally, in bench scale preparations and similar synthetic approaches involving stirred slurries of the base reactants, being the base MOF and polyamine ligands dissolved in a suitable solvent or cosolvent suspension, a large excess of the polyamine, generally a molar excess of about 60 eq (equivalents) is employed to drive the amination reaction to either completion or at least a higher yield. In contrast, the embodied methods disclosed herein enable high yields and recovery of the aminated MOF material while requiring only about 3 eq of the polyamine to be used in the amino-functional modification step. Correspondingly, the reduced need to use a large excess of the polyamine translates to a significant savings in materials and cost, but also enables the faster and more efficient cleaning and recovery of the final aminated MOF material, due to the reduction of excess unreacted reagents to remove. Accordingly, the improved methods disclosed herein for the preparation of a base MOF material and its subsequent amination reaction to produce an aminated MOF material enable the use of lower amounts (equivalents) of the polyamine material with respect to the base MOF material, the required number of equivalents, accordingly, being between 1 to 20 equivalents, or alternatively between 1 to 10 equivalents, or yet alternatively between 1 to 5 equivalents.

Figure 8:
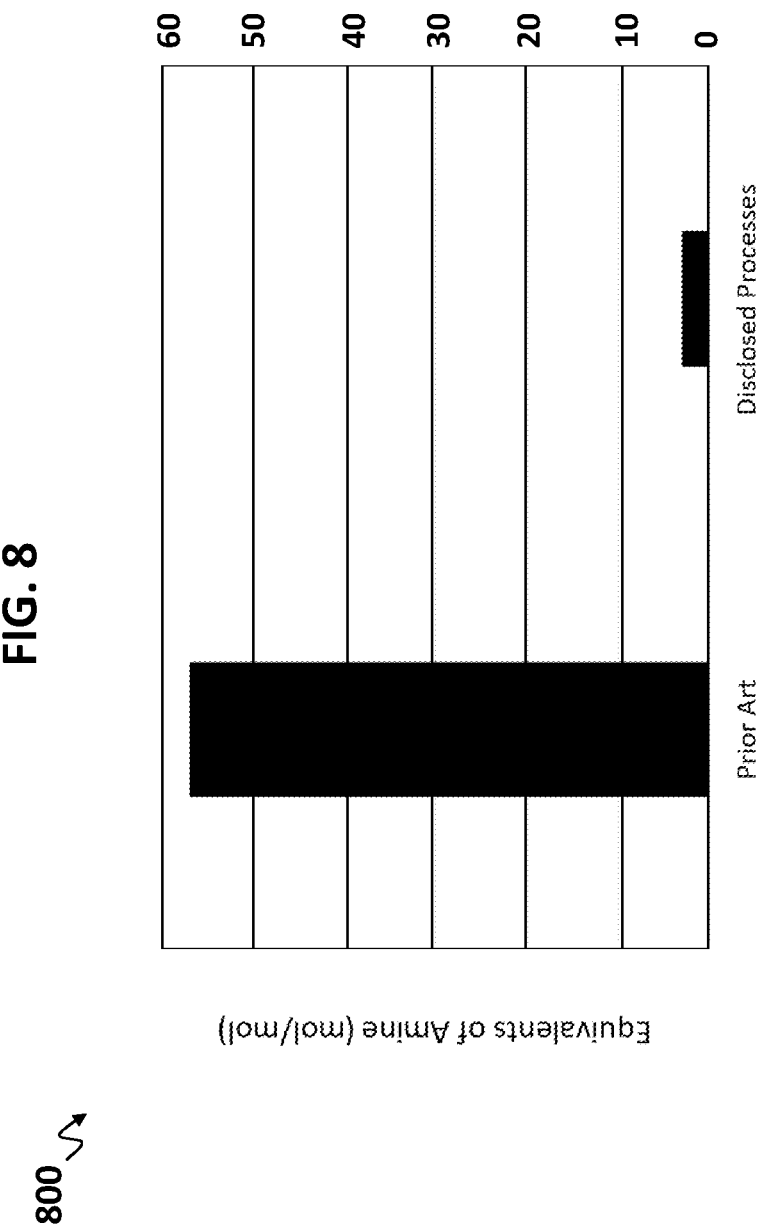
FIG. 8 illustrates the number of equivalents (eq) of an amine moiety needed in the disclosed process step 206 comparing to that required by a typical prior art process.

A comparison is presented in FIG. 8, which illustrates the number of equivalents (eq) of an amine moiety needed in the disclosed process step 206 comparing to that required by a typical prior art process. Typical prior art processes, such as reported by Long (*Chem. Sci.*, 2018, v. 9, p. 160) require 57 eq compared to the disclosed processes herein which require on average, a significantly lower amount on the order of only 3 eq.

Process Parameters

Table 3 shows the properties of isolated MOF materials obtained by means of the inventive processes, steps and substeps disclosed herein, contrasting the properties (shown in column 1) of an ideal or "optimized" product (shown in column 2) to product obtained from a larger batch process producing kilogram scale quantities (column 3).

Comparing the final conductivity of materials, the disclosed processes produced kilogram levels of aminated MOF products having similar values to that obtained from bench scale synthesis. The pH of the final water rinse step was measured to gauge the effectiveness of the purification process using industrial equipment at scale. Results show that while the resulting wash water was slightly more alkaline (pH 10.4) that that obtained at bench level, it is still suitable for use, the aminated MOF materials being stable at higher pH's. It should be noted that with respect to pH, even a very slight increase in alkalinity results in a greater pH as the base employed, here sodium hydroxide, is not self-buffering so that pH is not as effective as a measurement of total alkalinity. Nevertheless, it remains a suitable screening tool following multiple rinsing steps to determine a reasonable end point.

Table 3 shows some process parameters determined from the preparation of small (bench scale) aminated MOF materials (research sample produced by use of the processes disclosed herein at lower gram levels, but not detailed here) and those obtained from preparation of the same materials at larger, kilogram-size (commercial scale) production levels representative of the experimental production exemplified hereinabove in one embodiment.

Purification of the base MOF and final aminated MOF materials is important to remove excess unreacted components and unwanted impurities such as salts that may be present at one or more stages in the overall manufacturing process. In Table 3, the conductivity of the final wash water following the final step in aminated MOF production is compared, showing acceptable levels of conductivity of below 2 mS/cm$^3$, or alternatively below 1.5 mS/cm$^3$, indicative of having reduced any residual salt content to an acceptable level.

Measurement of final wash water pH after multiple rinsing steps shows an acceptable reduction in alkalinity at both production scales, MOF material from the bench scale synthesis having a lower rinse water pH of about 9, compared to the large scale batch associated with a slightly higher pH of about 10.4, both within the acceptable final water wash pH range of 7 to 11 pH units, or alternatively between 8 to 11, or yet alternatively between 9 to 11. Owing to the sensitivity of the pH scale to alkalinity within 2 units of neutral (pH 7), this measurement provides a means to quickly screen the materials during processing in order to determine if additional rinse or washing steps are required. In related embodiments, an additional rinsing or washing step would be indicated until the water wash pH was measured and found to exceed the preferred ranges disclosed above, depending on the degree of purity desired for a particular production batch and its ultimate use or selection for additional processing according to one or more of the disclosed embodiments.

In addition to final conductance and pH, it is desirable to remove excess unreacted components as well, so that the acceptable purity parameters are selected from a minimum free cationic metal salt residual level, a minimum free polytopic organic ligand level, a maximum rinse water conductivity, a maximum alkalinity level, and combinations thereof. These are measurable by conductance and pH, and analytical screening methods such as spectroscopy to measure unreacted organic components and thus enable addition filtering and wash steps as needed to obtain a desired acceptable purity parameter of the MOF materials obtained at the various process steps as well as the ultimate purified MOF materials prior to use. In related embodiments, acceptable purity parameters correspond to maximum impurity level of the respective excess unreacted component of less than 1 weight % (10,000 ppm), or alternatively less than 0.1 weight % (1,000 ppm) or yet alternatively less than 0.01 weight % (100 ppm), of the respective component in the ultimate purified MOF materials obtained by the methods disclosed herein.

The remaining parameters in Table 3 relate to measurements of performance of MOF materials obtained according to one or more of the disclosed process steps, including both the intermediate base MOF material as well as the final aminated MOF material in a final extrudate form suitable for instant use in a sequestration operation or sequestration apparatus for DAC or PSC applications.

Table 3 shows acceptable specific surface areas as determined by BET and Langmuir models from measurements at 77 K using nitrogen gas ($N_2$) exhibited by both the comparative bench and kilogram scale production levels of the base (non-aminated) MOF materials according to the disclosed process means herein, the resulting BET surface area being greater than 3200 $m^2/g$ for both materials, exceeding the desired minimum BET value of 2500 $m^2/g$, or yet alternatively 3000 $m^2/g$. Various aliquots of the comparative bench scale level product were measured to determine the relative accuracy and reproducibility of the method, resulting in an average Langmuir surface area of 3,591+/−324 $m^2/g$ for the bench scale product, and correspondingly about 3736 $m^2/g$ (+/−324) for the kilogram scale product.

Figure 3:
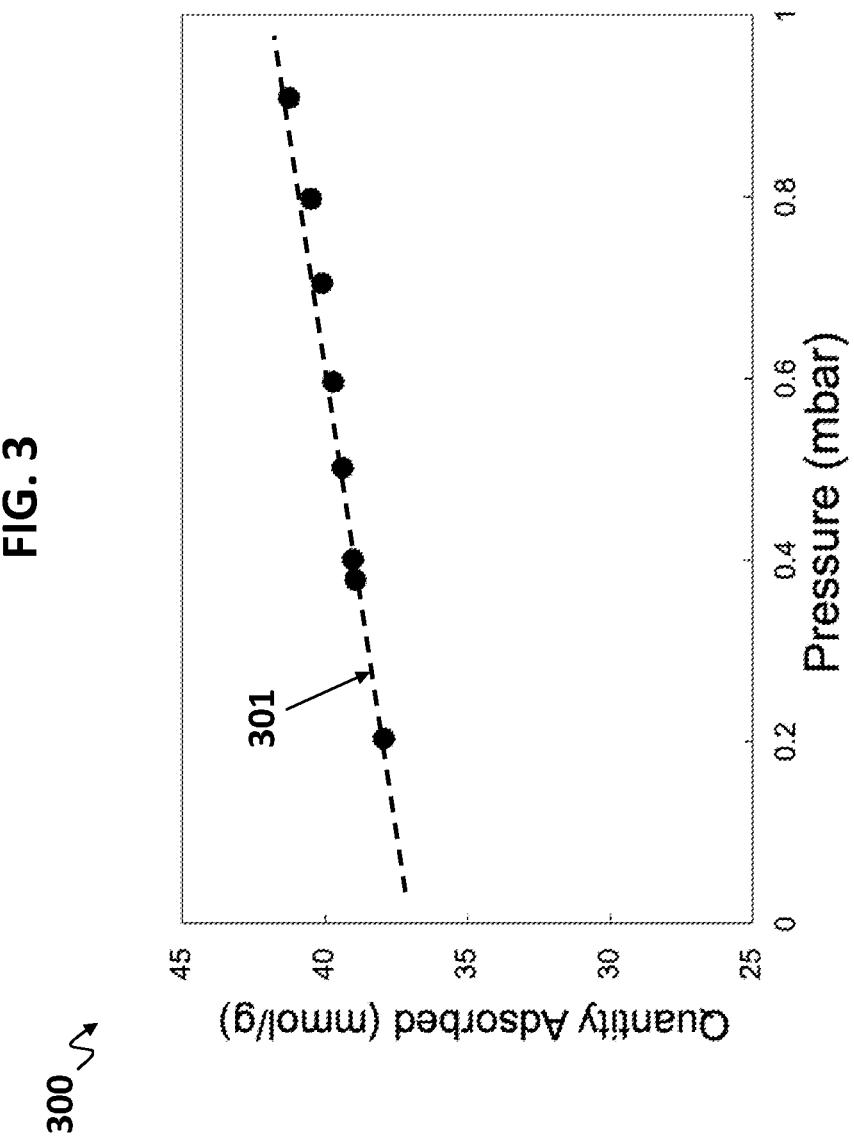
FIG. 3 illustrates a surface area plot of a nitrogen ($N_2$) adsorption isotherm exhibited by an exemplary MOF material produced using the disclosed processes.

FIG. 3 shows a surface area plot (300) of a nitrogen ($N_2$) adsorption isotherm exhibited by an exemplary MOF material produced using embodiments of the disclosed processes. The isotherm follows an approximately linear relationship between the observed adsorption (in units of millimolar per gram (mmol/g) and pressure in units of millibar (mbar), based on a least squares linear best fit (301).

Figure 4:
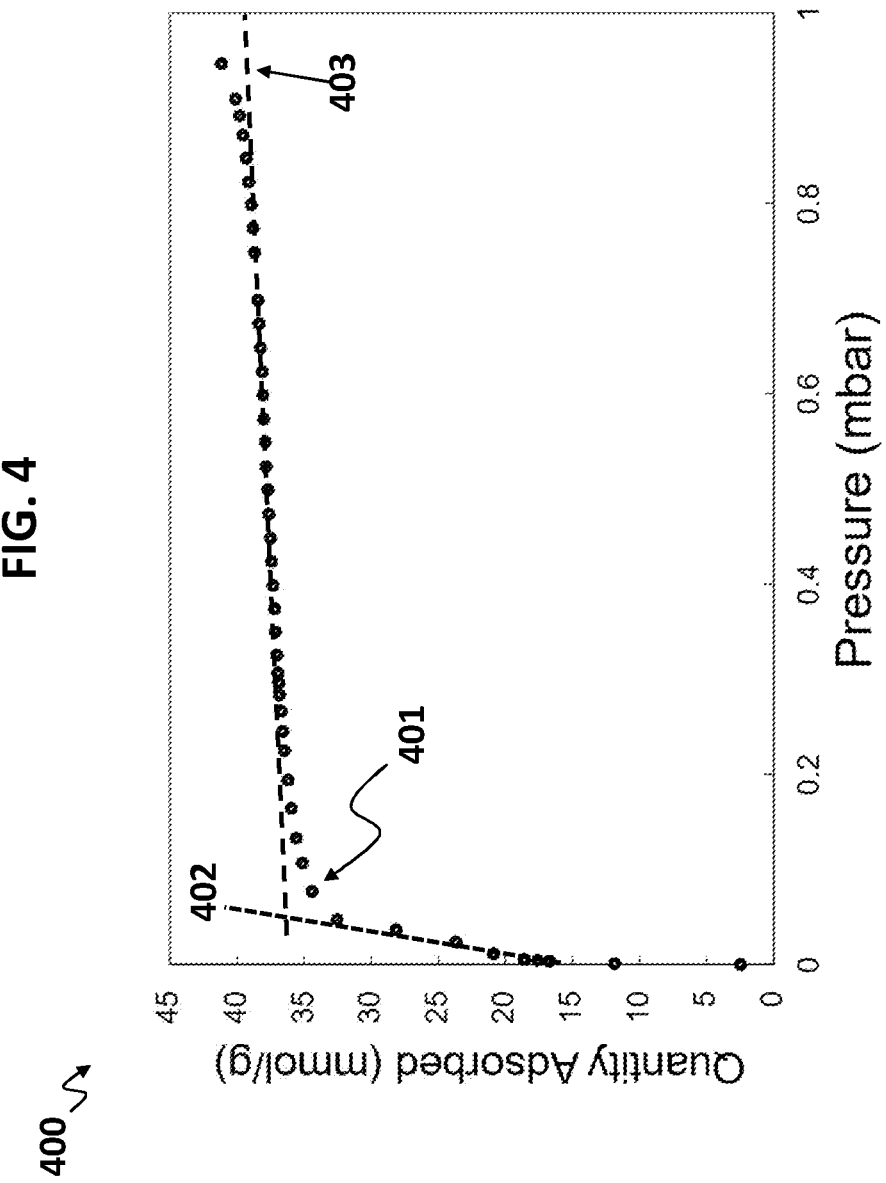
FIG. 4 illustrates a surface area plot of a nitrogen ($N_2$) adsorption isotherm exhibited by an exemplary MOF material produced using a bench scale process.

FIG. 4 shows a nitrogen ($N_2$) adsorption isotherm (400) exhibited by an exemplary MOF material produced using a bench scale process as embodied in the present disclosure.

The bench scale produced MOF materials exhibit a complex adsorption behavior, including an initial steep nearly liner adsorption response indicated by the dotted linear trace 402 which reaches an inflection point at 401, followed by an approximately flat linear response indicated by dashed linear trace 403 through the remaining pressure range, without increasing significantly over that range until a higher pressure of about 0.95 mbar is applied. This indicates that embodiments of the bench scale produced MOF materials show a bimodal linear saturation response with an inflection point at around 0.1 mbar, above which the adsorption achieves levels near saturation with only a small amount of nitrogen sequestered up to about 0.95 mbar of pressure.

Example embodiments of MOF materials produced using the disclosed process exhibit a similar, but even more preferred and predictable adsorption response that increases over the desired operating pressure range and thus enables improved control as well as increasing adsorption as the pressure approaches 0.95 mbar, indicating that the disclosed processes are capable of producing MOF materials with the desired characteristics and some added advantages with regard to controlling adsorption characteristics over extended pressure ranges.

It is to be noted that similar nitrogen BET measurements of the aminated MOF product, following amino-modification of the base MOF intermediary material, result in values of between about 100-500 $m^2/g$, indicative of the ability of the disclosed process herein to effectively modified and aminate the base MOF material. Without being bound by theory, it is believed that a ratio of the BET values (base MOF:aminated MOF product) may provide a means to determine the relative level of amination, e.g. a parametric means to determine and confirm the degree of amination or synthetic yield of amino-modified (or other modification) MOF versus a base MOF material.

Additional measurements of the ultimate carbon dioxide adsorption capacities were performed yielding optimum 1:1 ratios of $CO_2$:amine as determined by the TGA isobar using 100% $CO_2$ gas feed, showing the scalability of the disclosed processes in producing effective aminated MOF material at larger scales according to the embodiments of the disclosed invention, and indicative of quantitative saturation of the MOF materials to the theoretical limit (1:1).

The secondary ligand, or polyamine, being based on diamines, triamines, or tetraamines, impacts the aminated MOF materials carbon dioxide capture performance such that the resulting TGA isobar data may display no-step, single-step, or double-step adsorption characteristics. This TGA isobar method is used for characterization and quality control and the resultant characteristic adsorption step shape does not negate use of a material in acid gas applications but instead describes the adsorption phenomena occurring within the resultant materials. Additionally, the characteristics of a step-shaped isotherm will be dependent upon the identity of the secondary ligand, such that differing the amine will yield different resulting TGA isobars and adsorption temperatures as detailed below. Similar effects to the TGA isobar have been reported in the literature when utilizing different metal sources or combinations of metal sources to synthesize the disclosed materials and are all well within the scope of this disclosure. The disclosed processes are for the manufacturing materials that can be utilized for carbon dioxide or other acid gas capture applications, and thus materials produced by the processes exhibiting no-step, single-step, or double-step adsorption phenomena, are all within the scope and spirit of the disclosure.

In this example, the resultant material displayed a double-step isotherm shape and the low and high temperature $CO_2$ adsorption steps were also measured and compared, these being indicative of the ability of the aminated MOF materials to capture carbon dioxide effectively. The MOF exhibits two steps in the adsorption step, a high-temperature step first, followed by a second adsorption step at a lower temperature. There is no desorption in the TGA isobar. The MOF exhibits two steps in the adsorption step, a high-temperature step first, followed by a second adsorption step at a lower temperature. The MOF is heated to 150° C. and then cooled to room temp at a constant rate, adsorption begins around 120 C and a second step is seen at 70° C., well within the acceptable range desired of between 50 to 80° C., or alternatively between 60 to 75° C., or yet alternatively between 65 to 70° C. in other embodiments, depending on the intended application, for example whether the MOF will be employed in a DAC or PSC application. This value compared well with the bench scale value for various aliquots prepared, exhibiting a range of between 66 to 70° C. for the low temperature adsorption step value. The high temperature adsorption step for the kilogram scale product was determined to be 116° C., well within the acceptable range desired of between 100 to 150° C., or alternatively between 110 to 140° C., or yet alternatively between 110 to 130° C., depending on the intended application. This value compared well with the bench scale value for various aliquots prepared which exhibited a range of between 114 and 116° C. for the high temperature adsorption step.

Figure 5:
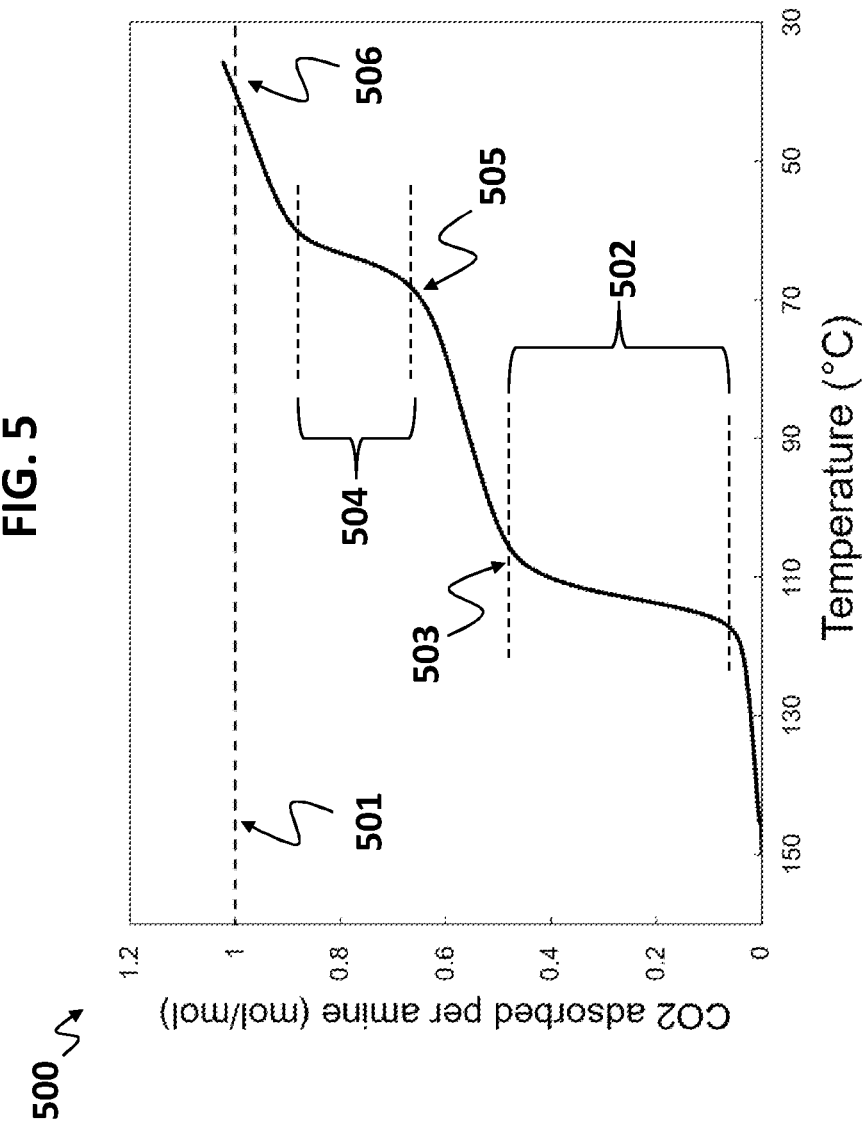
FIG. 5 illustrates an adsorption isotherm of a pure (100%) carbon dioxide ($CO_2$) isobar as determined by thermogravimetric analysis for an exemplary aminated-MOF material produced using an embodied process as disclosed at a larger scale level.

FIG. 5 shows the temperature-dependent adsorption isotherm (500) of a pure (100%) carbon dioxide ($CO_2$) isobar as determined by thermogravimetric analysis for an exemplary aminated-MOF material produced using the disclosed processes as embodied herein at a larger (kilogram) scale level.

As seen in this embodiment, the adsorption behavior exhibits a two-step isotherm, indicated by a first adsorption region (502) which starts at a high temperature of about 115° C., reaching an inflection point (503) at about 105° C. at which point a second adsorption region (504) in the isotherm at a lower temperature begins after a second inflection point (505) at approximately 68° C., ultimately with increasing adsorption until a cross-over adsorption point (506) is reached at the molar adsorbance limit (501) denoted by the dotted line at a temperature of approximately 40° C. The exemplary MOF materials produced by the embodied processes as disclosed in FIG. 5 show excellent adsorption at the fairly low temperature of about 35 to 40° C., with two sigmoidal adsorption regions indicative of a two-step adsorption behavior wherein, without being bound by theory, two energetically different types of binding sites are present within the embodied MOF materials, enabling precise control of adsorption with temperature. It is also noted that the first step region exhibits a relatively steep and nearly linear desorption behavior as the temperature is increased above the first inflection point, a favorable property to enable the rapid and near complete desorption of adsorbed carbon dioxide to recycle the material for additional use. Measurements of the TGA isobar (see also Table 3) show that the resultant materials obtained using embodiments of the disclosed processes exhibit a high temperature adsorption step between about 110 and 120° C. (at first inflection point 503) and a low temperature adsorption step between about 65-70° C. (at the second inflection point 505.

Figure 6:
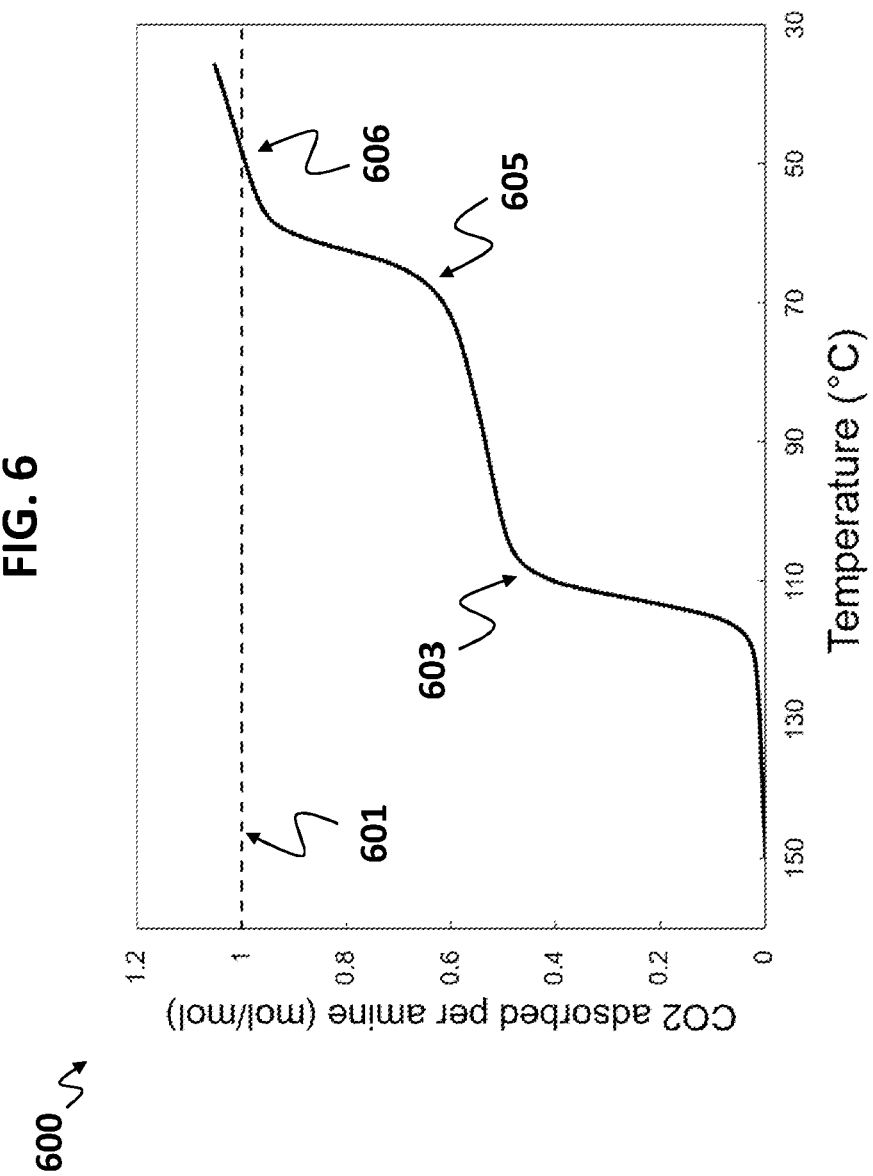
FIG. 6 illustrates a pure (100%) carbon dioxide ($CO_2$) isobar as determined by thermogravimetric analysis for an aminated-MOF material produced using an embodied process as disclosed at bench scale.

FIG. 6 illustrates a pure (100%) carbon dioxide ($CO_2$) isobar or adsorption isotherm (600) as determined by thermogravimetric analysis for an aminated-MOF material produced using an embodied process as disclosed at a bench scale (sub-kilogram) level. The $CO_2$ adsorption isotherm 600 shows a first inflection point (603) at a temperature of about 105° C. and a second inflection point at about 65° C., very similar to the properties exhibited by the larger scale produced MOF material as shown in FIG. 5. Further, the cross-over saturation point (606) was found to be around 48° C., similar as well to that observed in FIG. 5 for the kilogram scale level production, although higher in relative temperature but well within the range of acceptability with regard to the molar saturation limit 601 exhibited by the MOF materials as produced herein.

Accordingly, it is observed by comparison of FIGS. 5 and 6 that embodiments of the disclosed process successfully produce MOF materials at larger kilogram-level scales that exhibit the desired characteristics as obtained from using a bench-scale level process.

Figure 7:
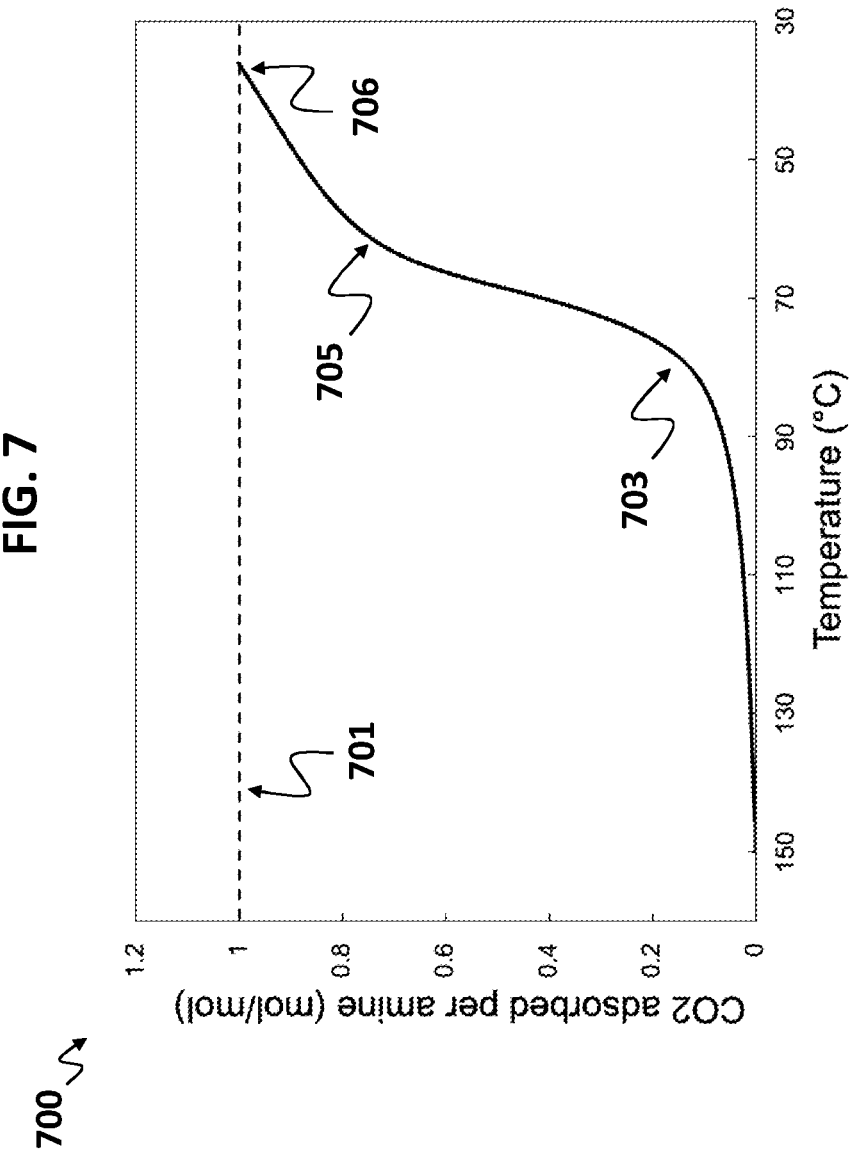
FIG. 7 shows an example of a single-step 100% $CO_2$ Isobar as determined by thermogravimetric analysis exhibited by an exemplary aminated-MOF material.

FIG. 7 shows an example of a single-step 100% $CO_2$ Isobar (700) as determined by thermogravimetric analysis exhibited by an exemplary aminated-MOF material also produced at larger kilogram-level scale according to the disclosed methods embodied herein. In FIG. 7, the MOF material exhibits a single-modal (sigmoidal) shape adsorption curve (703) with an inflection point (705) between 55 to 65° C., reaching a cross-over saturation point (706) at about 35° C. This behavior enables close to room temperature (25° C.) operation of the MOF materials and a favorable low temperature desorption onset when the material is later heated to desorb captured $CO_2$ for recovery.

In further embodiments, combinations of purified aminated MOF materials that exhibit a single modal (sigmoidal) carbon dioxide isotherm and a bimodal carbon dioxide isotherm are envisioned, combined at any ratio to obtain a mixture that exhibits a combination of desired properties with respect to carbon dioxide adsorption and desorption over operating temperature ranges. In one exemplary embodiment, combinations of one or more single and bimodal adsorption exhibiting MOF materials are selected to obtain a resultant mixture that exhibits a high temperature isobar adsorption step as determined by TGA between 100 to 150° C., a low temperature isobar adsorption step between 50 to 80° C., and a molar absorbance limit of carbon dioxide below 50° C.

Accordingly, the properties and measured characteristics of the MOF materials produced using the larger-scale aqueous based preparation and synthesis methods as disclosed in the various embodiments presented herein demonstrate the feasibility of producing MOF materials at larger, more practicable and thereby more economical scales needed to prepare the quantities required for industrial use while maintaining the favorable performance attributes and properties desired for functionality and repeated use.

FIG. 8 illustrates the number of equivalents (eq) of an amine moiety needed in the disclosed process step 206 comparing to that required by a typical prior art process.

FIG. 8 compares the number (800) of amine molar equivalents (eq) needed to produce a MOF material capable of adsorption a molar equivalent of carbon dioxide, the right most bar indicated typical art synthetic methods requiring in excess of 50 mol/mol (molar) amine equivalents (eq), as compared to embodied MOF materials produced by means of the disclosed methods herein, which require less than 20 eq, or alternatively less than 10 eq, or alternatively less than 5 eq, or yet alternatively less than 3 eq.

Accordingly, the representative parameters disclosed and discussed hereinabove illustrate the ability of the inventive methodologies to produce larger, commercial scale quantities of the aminated MOF materials having similar and acceptable performance properties to those obtained at experimental or bench scale levels.

In addition, the ability of the post synthesis processing steps that relate to the recovery of solid particulate aminated MOF material and its physical conversion to extruded forms suitable for commercial use are illustrated in Table 3, with the measurement of extrudate density and hardness. Values obtained from various aliquots of the comparative bench scale production of aminated MOF following the addition of binder, agglomeration, and subsequent extrusion to form the final extrudate illustrates the difficulty in reproducibility of processing smaller amounts of material, showing significant variability. For example, samples at bench scale showed extrudate densities ranging from 0.4 to 0.7 g/cm$^3$, and corresponding extrudate harnesses of between 3 to 20 N/mm, demonstrating poor cohesion and strength at the lower levels, although some samples produced acceptable extrudates with densities of greater than about 0.5 g/cm$^3$, and hardness values of greater than about 10 N/mm. In contrast, extrudates processed using larger amounts of material obtained from the commercial size production resulted in extrudates with improved density and hardness values of 0.7 g/cm$^3$ and about 20 N/mm, respectively. Generally, values of extrudate density between 0.5 to 1.0 g/cm$^3$, or alternatively between 0.6 to 0.9 g/cm$^3$, or yet alternatively between 0.6 to 0.8 g/cm$^3$ are acceptable for use in carbon sequestration operations. Further, values of extrudate hardness greater than about 5 N/mm, or alternatively greater than about 10 N/mm or yet alternatively greater than about 15 N/mm are acceptable for use in carbon sequestration operations, being robust enough to survive transportation, handling, packing and repacking operations in sequestration equipment.

Accordingly, the representative values relating to extrudate density and integrity (hardness) for final aminated MOFs materials in extrudate form produced by means of the embodied processes disclosed herein confirm the ability of these processes to manufacture carbon dioxide sequestration materials in a form suitable for commercial level applications.

TABLE 3

Process Parameters

| Process Result | Optimum Result (Bench scale) | Results (1 Kg scale) |
|---|---|---|
| Conductivity of Water Wash (mS/cm$^3$) | ca. 1 | 1.13 |
| Final Water Wash pH | 9 (+/−2) | 10.4 |
| BET (Langmuir) Surface area of Base MOF at 77K $N_2$ (m$^2$/g) | 3266-3915 (+/−324) | 3736 (+/−324) |
| $CO_2$ Capacity:100% $CO_2$ TGA Isobar ($CO_2$:Amine Ratio) | 1:1 | 1:1 |
| TGA Isobar: High temperature adsorption step (° C.) | 114-116 | 116 |
| TGA Isobar: Low temperature adsorption step (° C.) | 66-70 | 70 |
| Extrudate Density (g/cm$^3$) | 0.4-0.7 | 0.7 |
| Extrudate Hardness (N/mm) | 3-20 | ca. 20 |

One advantage of embodiments of the present disclosure is that the inventive materials and processes provide multiple pathways to industrial scale manufacturing of MOFs from bench scale to multi-kilogram scale levels of production. An additional advantage of the disclosed embodiments are methods of manufacturing MOFs using less costly and more environmentally friendly solvents during synthesis.

In related embodiments of the present disclosure, the order of the steps may be performed in a serial mode or alternatively in a batch mode. Further embodiments include the performance of steps in different order than those exemplary processes discussed herein, as well as the performance of substeps in any particular process step. In further embodiments, some steps may be optional, depending on the nature of the materials employed, or alternatively, some steps may be repeated more than once or a plurality of times, for example but not limited to separation, filtering, washing, conditioning, sizing, and extrusion steps.

Process Solvents

Solvents used in the disclosed methods herein are presented in Table 4. The first two solvents dimethylformamide and hexane are typical materials employed previously in the field, however both have significant issues relating to toxicity and potential for carcinogenicity. Accordingly, the methods of the present disclosure employ other solvents that are generally safer, less costly, more easily handled and recovered, and have better short and long-term safety and toxicological properties.

In the first base MOF preparation and purification steps, the reactants and materials employed are water soluble or water miscible in nature, enabling the use of water as a primary aqueous solvent and the use of a water-miscible secondary coupling cosolvent. In the disclosed embodiments herein, water is combined with a secondary solvent selected from, but not limited to acetonitrile, ethyl acetate, methanol, ethanol, 1-propanol, and 2-propanol (iso-propyl alcohol), and combinations thereof. These solvents all exhibit acceptable dielectric constants of between about 5 and 40, and polarities (using the Reich polarity index) of between about 2 to 8, both properties contributing to their effectiveness in coupling with aqueous-soluble materials as well as less-water soluble reactants, and with water to improve reaction efficiency and yields. With respect to the alcohol solvents, methanol and the propanols are generally preferred for use in a second or final rinsing or purification step according to one or more of the disclosed methods herein, methanol in particular being that the propanol's forming less intractable azeotropic mixtures with water owing to the larger boiling point differences between them, e.g. the B.P. of 1-propanol being 97.3° C. versus its water azeotropic mixture at 87.7° C. (a delta of 9.6° C.) and that of 2-propanol being 82.5° C. versus its water azeotropic mixture at 80.4° C. (a delta of 2.1° C.), contrasting with the mere difference of about 0.3° C. between that of ethanol (BP 78.4° C.) and its water azeotrope that boils at 78.1° C., from which quantitative solvent recovery and reuse is more difficult to achieve. Accordingly, these exemplary solvents all exhibit acceptable flash points of less than about 25° C., and boiling points of less than about 85° C., both being properties enabling the more effective removal and recovery with respect to time and energy expenditure.

In the second aminated MOF preparation and purification steps, the choice of solvent is limited owing to the reactant nature of the polyamines, precluding the use of alcohol functionalized solvents which would not be compatible. Accordingly, the reaction solvents employed herein include, but are not limited to acetonitrile and ethyl acetate, toluene, and the like. These solvents are water miscible and have acceptable properties of flash point, boiling point, dielectric constant, and polarity for use in the disclosed methods herein, as well as being safer for use and handling owing to their lower toxicities. In contrast, dimethylformamide has a flash point of 58° C. and a boiling point of 153° C., requiring higher temperatures and time to remove and recover from a reaction blend. Further, hexane has an extremely low flash point of −22° C., requiring extra caution in its handling and recovery, particularly owing to its having known carcinogenic properties.

Without being bound by theory, it is believed that the combination of a primary aqueous solvent, water, with an optional secondary and/or optional tertiary water-miscible cosolvent during a solvo(hydro)thermal (solvothermal) synthesis results in some improvement in the resulting base MOF material produced with respect to crystal size, uniformity, and size distribution of the resulting MOFs. Studies by Dr. Jianjun Wu ("*Dielectric Constant Controlled Solvothermal Synthesis of a $TiO_2$ Photocatalyst with Tunable Crystallinity: A Strategy for Solvent Selection*", Jianjun Wu, et al., EurJIC, v 2009, No. 19, July 2009, pp 2789-2795; https://doi.org/10.1002/ejic.200900199) have shown that the choice of solvent mixtures guided by their dielectric constants for use in a solvothermal synthesis of titania can be used to tune the resulting crystallinity parameters of materials obtained. Accordingly, it is believed that the use of select solvents, and combinations of a secondary and optionally a tertiary cosolvent with water, such as for example acetonitrile/water, ethyl acetate/water, acetonitrile/water/alcohol mixtures employed in the solvothermal synthetic methods disclosed herein surprisingly enable the preparation of base MOF materials with improved physical and chemical characteristics, including at least the ability of the materials to be more readily and efficiently aminated using a lower equivalency of polyamine materials in the second, subsequent amino-modification step that produces the ultimate aminated MOF material.

TABLE 4

Solvent Properties

| Solvent (1) | Flash Point (° C.) | Boiling Point (° C.) | Dielectric Constant (2) | Polarity (3) |
|---|---|---|---|---|
| Dimethylformamide | 58 | 153 | 38.3 | 3.9 |
| Hexane | −22 | 69 | 1.9 | 0.1 |
| Acetonitrile | 6 | 81.7 | 36.6 | 4.6 |
| Ethyl Acetate | −4 | 77 | 6 (25) | 2.3 |
| 1-propanol | 22 | 82.4 | 20.1 (25) | 4.0 |
| 2-propanol | 12 | 82.4 | 18.3 (25) | 5.5 |
| Methanol | 12 | 64.6 | 32.6 (25) | 7.6 |
| Ethanol | 13 | 78.5 | 24.6 | 6.5 |
| Water | — | 100 | 78.5 | 10.0 |

(1) Division of Organic Chemistry (ACS), "*Common Solvent Used in Organic Chemistry: Table of Properties*" (2005), Dr. Brian J. Myers. Derived from CRC 87th Edition, CRC Press, LLC.
(2) T = 20° C., unless otherwise indicated
(3) Reich Polarity index Further advantages offered by the present methods and processes disclosed herein include a means to produce MOF materials suitable for use as DAC and PSC MOF sorbents that do not require high temperatures and pressures to manufacture, and the subsequent advantage of employing simpler equipment that is less energy intensive and which provides for improved yields. Embodiments of the disclosed methods described herein enable MOF synthesis to be done under refluxing water conditions at ambient pressures with greater than 80-90% yields.

An additional advantage of embodiments of the present disclosure are methods that enable the use of an order of magnitude fewer stoichiometric equivalents of the amine moiety to aminate the base MOF materials compared to traditional processes, resulting in significant cost savings and reduction in waste byproducts during production.

Yet another advantage of embodiments of the present disclosure are methods that enable the washing and filtration of both base MOF and aminated MOF materials using less solvent by means of employing a filter plate press, such as a Mudhen press, offering significant scaling ability as well as the elimination of vacuum-based filtration methods that are more complicated and costly to perform at higher production levels.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and, in a manner, consistent with the scope of the invention, as set forth in the following claims.

AQUEOUS MANUFACTURE OF AMINATED MOF COMPLEXES

APPENDIX

Figure Key

| Element | Description |
|---|---|
| FIG. 1 | |
| 100 | MOF sorbent process (diagram) |
| 102 | MOF precursors |
| 103 | MOF support preparation |
| 104 | Alkyl functionalized amine ligands |
| 105 | Isolation of MOF sorbent |
| 106 | Base MOF support |
| 108 | Aminated MOF support |
| 110 | MOF sorbent product |
| FIG. 2 | |
| 200 | MOF sorbent preparation (diagram) |
| 202 | Base MOF synthesis |
| 204 | Filtration/washing step |
| 205 | Amine ligand source |
| 206 | Animation reaction step |
| 208 | Filtration step |
| 210 | Isolation of wet aminated MOF |
| 212 | Drying step |
| 214 | Size screening step |
| 216 | Binder addition |
| 218 | Granulation step |
| 220 | Extrusion step |
| FIG. 3 | |
| 300 | Nitrogen adsorption isotherm |
| 301 | Least squares linear best fit |
| FIG. 4 | |
| 400 | Nitrogen adsorption isotherm |
| 401 | Inflection point |
| 402 | Dotted linear trace |
| 403 | Dashed linear trace |
| FIG. 5 | |
| 500 | $CO_2$ adsorption isotherm |
| 501 | Molar saturation limit |
| 502 | First adsorption region |
| 503 | First inflection point |
| 504 | Second adsorption region |
| 505 | Second inflection point |
| 506 | Cross-over saturation point |
| FIG. 6 | |
| 600 | $CO_2$ adsorption isotherm |
| 601 | Molar saturation limit |
| 603 | First inflection point |
| 605 | Second inflection point |
| 606 | Cross-over saturation point |
| FIG. 7 | |
| 700 | $CO_2$ adsorption isotherm |
| 701 | Molar saturation limit |
| 703 | Sigmoidal behavior |
| 705 | Inflection point |
| 706 | Cross-over saturation point |
| FIG. 8 | |
| 800 | Comparison of amine equivalents |

What is claimed is:

1. A process for the preparation of an aminated metal-organic framework product for the adsorption and desorption of carbon dioxide comprising the steps of:

(a) obtaining a crude base MOF material by the synthetic means of combining at least one cationic metal salt and at least one polytopic organic ligand in a mixed solvent system comprising water and optionally, a first cosolvent;

(b) subjecting said crude base MOF material obtained from the preceding step (a) to stirring and heat for a selected period of time;

(c) isolating a purified base MOF material obtained from the preceding step (b) by means of rinsing said crude base MOF material using a cake filter press apparatus in combination with at least one solvent selected from water and said first cosolvent;

(d) additional filtering and purification of said purified base MOF material obtained from the preceding step (c) to obtain a filtered and purified base MOF material with sufficiently low excess soluble components so as to result in an acceptable purity parameter value;

(e) obtaining an aminated MOF material by means of an amination reaction between a combination of said filtered and purified base MOF material obtained from step (d) and at least one alkyl-functionalized amine in a solvent system comprising at least one second cosolvent;

(f) subjecting said resultant aminated MOF material obtained from the preceding step (e) to a combination of stirring, and optionally heating, for a selected period of time; and (e) isolating a purified aminated MOF material obtained from the preceding step (f) by means of rinsing the reaction products thereof using a cake filter press apparatus in combination with at least one third cosolvent.

2. The process of claim 1, wherein said acceptable purity parameter is selected from a minimum free cationic metal salt residual level, a minimum free polytopic organic ligand level, a maximum rinse water conductivity, a maximum alkalinity level, and combinations thereof.

3. The process of claim 1, wherein said first, second and third cosolvents are selected from acetonitrile, ethyl acetate, toluene, methanol, ethanol, 1-propanol, and 2-propanol, and combinations thereof.

4. The process of claim 1, wherein said first, second and third cosolvents are selected from solvents exhibiting a dielectric constant of 5 to 40, and a Reich polarity index of 2 to 8.

5. The process claim 1, wherein said first, second and third cosolvents are selected from solvents exhibiting a flash point greater than −20° C. and less than 25° C., and a boiling point of less than 85° C., including combinations of said first, second and third cosolvents thereof in any proportion.

6. The process of claim 1, wherein said polytopic ligand is selected from 4,4'-dioxidobiphenyl-3,3'-dicarboxylate, 4,4"-dioxido-[1,1':4',1"-terphenyl]-3,3"-dicarboxylate, 2,5-dioxidobenzene-1,4-dicarboxylate, and 3,3'-di hydroxy-4,4'-biphenyldicarboxylate, and the respective protonated forms thereof, and combinations thereof.

7. The process of claim 1, wherein said cationic metal salt comprises a salt of a polycationic metal selected from Mg, Ca, Mn, Cr, Fe, Co, Ni, Cu, Zn, Sr, Ba and Cd, and combinations thereof.

8. The process of claim 1, wherein said alkyl-functional amine is a polyamine selected from a diamine, triamine and tetramine organic compound, and combinations thereof; and wherein the number of molar equivalents (eq) of said polyamine with respect to said filtered and purified base MOF material in step (e) used in said amination reaction is less than 20 molar equivalents.

9. The process of claim 8, wherein said number of molar equivalents is less than 10 molar equivalents.

10. The process of claim 8, wherein said number of molar equivalents is less than 5 molar equivalents.

11. The process of claim 1, wherein said purified aminated MOF material obtained from step (e) exhibits a bimodal carbon dioxide isotherm having a molar adsorbance limit of 1 mol/mol with respect to said carbon dioxide and said alkyl-functional amine that occurs at a temperature below 50° C.

12. The process of claim 11, wherein said molar absorbance limit occurs at a temperature below 40° C.

13. The process of claim 1, wherein said purified aminated MOF material obtained from step (e) exhibits a high temperature isobar adsorption step as determined by TGA between 100 to 150° C., and also exhibits a low temperature isobar adsorption step between 50 to 80° C.

14. The process of claim 13, wherein said purified aminated MOF material obtained from step (e) exhibits a high temperature isobar adsorption step as determined by TGA between 110 to 130° C., and also exhibits a low temperature isobar adsorption step between 60 to 75° C.

15. The process of claim 1, wherein said purified aminated MOF material obtained from step (e) exhibits a single modal (sigmoidal) carbon dioxide isobar adsorption step as determined by TGA between 70 to 90° C., and a molar adsorbance limit of 1 mol/mol with respect to said carbon dioxide and said alkyl-functional amine that occurs at a temperature below 50° C.

16. The process of claim 15, wherein said purified aminated MOF material exhibits said molar absorbance limit at a temperature below 35° C.

17. A method of using said purified aminated MOF materials obtained using the process of claim 1 to first (i) adsorb carbon dioxide from an environment, and then secondly (ii) desorb carbon dioxide into a containment means isolated from said environment.

18. The method of claim 17, wherein said purified aminated MOF materials are used in successive repeated steps of said first step (i) and said second step (ii) to control and maintain a desired carbon dioxide level in said environment by means selected from first cooling and then heating said purified MOF materials, respectively.

19. The method of claim 17, wherein said purified aminated MOF materials are selected from MOF materials that exhibit a single modal (sigmoidal) carbon dioxide isotherm, a bimodal carbon dioxide isotherm, and combinations of said MOF materials thereof.

20. The method of claim 19, wherein said combinations of said single and bimodal exhibiting MOF materials are selected to obtain a resultant mixture that exhibits a high temperature isobar adsorption step as determined by TGA between 100 to 150° C., a low temperature isobar adsorption step between 50 to 80° C., and a molar absorbance limit of carbon dioxide below 50° C.

\* \* \* \* \*